(12) United States Patent
Ohtsubo et al.

(10) Patent No.: US 7,809,259 B2
(45) Date of Patent: Oct. 5, 2010

(54) OPTICAL DISK AND OPTICAL DISK DEVICE

(75) Inventors: Kazumi Ohtsubo, Kurume (JP); Hiroaki Sakai, Fukuoka (JP); Shogo Horinouchi, Fukuoka (JP); Kazuhisa Ide, Ogoori (JP)

(73) Assignee: Panasonic Corporation, Osaka (JP)

( * ) Notice: Subject to any disclaimer, the term of this patent is extended or adjusted under 35 U.S.C. 154(b) by 1471 days.

(21) Appl. No.: 11/187,859

(22) Filed: Jul. 25, 2005

(65) Prior Publication Data

US 2006/0018243 A1    Jan. 26, 2006

(30) Foreign Application Priority Data

Jul. 26, 2004   (JP) ............................... 2004-216781
Jul. 29, 2004   (JP) ............................... 2004-221351
Aug. 19, 2004  (JP) ............................... 2004-239272

(51) Int. Cl.
G11B 7/00    (2006.01)

(52) U.S. Cl. .................................. 396/121; 369/124.03

(58) Field of Classification Search ............ None
See application file for complete search history.

(56) References Cited

U.S. PATENT DOCUMENTS

| 7,496,023 | B2 * | 2/2009 | Morishima et al. ........... 369/103 |
| 2003/0117932 | A1 | 6/2003 | Morishima et al. |
| 2003/0161224 | A1 * | 8/2003 | Anderson et al. ........ 369/30.58 |
| 2004/0008612 | A1 * | 1/2004 | Tsujita et al. ................ 369/283 |
| 2004/0089396 | A1 | 5/2004 | Hanson |
| 2004/0136291 | A1 * | 7/2004 | Hayashi ..................... 369/53.2 |
| 2005/0030878 | A1 * | 2/2005 | Park et al. .............. 369/112.08 |

FOREIGN PATENT DOCUMENTS

| JP | 200030408 | 1/2000 |
| JP | 200225222 | 1/2002 |
| JP | 200316650 | 1/2003 |
| JP | 2003203348 | 7/2003 |

\* cited by examiner

*Primary Examiner*—Paul Huber
(74) *Attorney, Agent, or Firm*—Dickinson Wright PLLC

(57) ABSTRACT

A first recording layer for recording information of an optical disk and a second recording layer of the optical disk on which a visible image can be recorded are disposed at an interval of 0.5 mm or more. Thus, even when a high power laser is used on one of the layers, data on the other layer will not be destroyed.

8 Claims, 18 Drawing Sheets

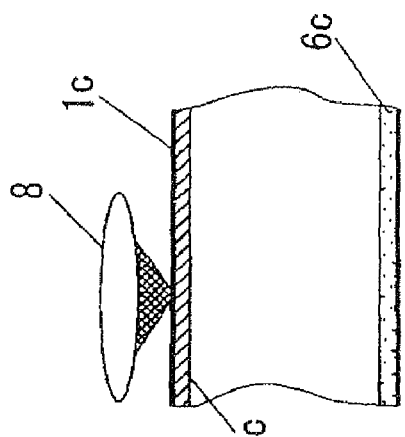 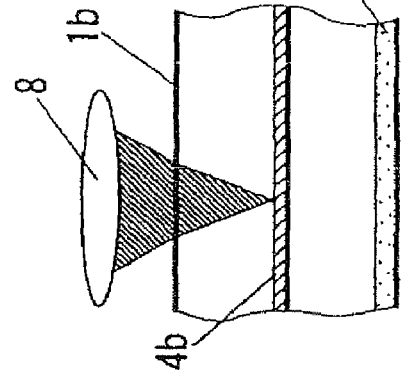 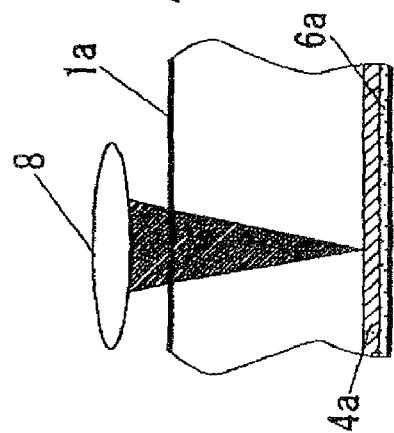
FIG. 4(a)    FIG. 4(b)    FIG. 4(c)
DATA RECORDING
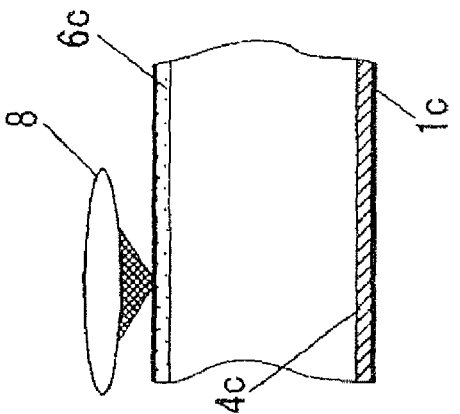   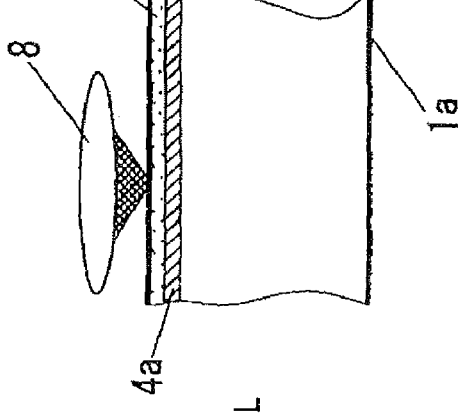
CD STANDARD    DVD STANDARD    BD STANDARD
RECORDING ON LABEL (RECORDING ON LABEL SURFACE)

(RECORDING ON DATA SURFACE)

$h \leq 0.4H$ (PRINTING ON LABEL SURFACE)

OPTICAL DISK AND OPTICAL DISK DEVICE

BACKGROUND OF THE INVENTION

1. Field of the Invention

The present invention relates to an optical disk and an optical disk device which is preferably used in a stationary electronic apparatus such as a personal computer, a portable electronic apparatus such as a notebook computer, a personal digital assistant, or a portable display unit, or a recorder for recording images. More particularly, the invention relates to an optical disk having a label surface on which visually perceivable characters and images can be recorded.

2. Description of the Related Art

Optical disk devices have widely spread as data reproduction devices in the fields of computers and audio visual apparatus because of the large recording capacity of optical disks and the ease of handling of optical disks. The recent spread of optical disk reproducing apparatus has provided an infrastructural background for remarkable spread of recordable optical disks in which various data such as images and music can be recorded, e.g., CD-R/RW, DVD-RAM, DVD-R/RW, and DVD+R/RW and recordable optical disk devices. In such recordable optical disk devices, a recording surface formed in a plane of an optical disk is irradiated with laser light to record images and music thereon.

In the situation where recordable optical disks and apparatus are rapidly increasing as described above, several proposals have been made, in the form of products, on how to provide visually perceivable characters and images on an optical disk to show contents recorded on a data recording surface of the optical disk. One approach is to use a printer in the related art. A label surface may be provided opposite to a data recording surface of an optical disk to allow direct printing on the label with an inkjet printhead. Alternatively, a sheet-like label may be printed and may thereafter be cut in the shape of an optical disk to apply the label to a label surface of the disk (see FIG. 1).

Another approach is to record a visible image on an optical disk using a laser loaded on an optical disk device. This approach includes a proposal in which a difference in reflectivity between a recorded part and an unrecorded part of a data recording layer of an optical disk is used (see FIG. 2) and a proposal in which a photosensitive layer, a thermosensitive layer, or a sheet having photosensitive/thermosensitive properties is applied to a label surface of an optical disk according to the related art to record a visible image on the same with a laser.

Examples of the above-described prior art are shown in JP-A-2003-16650 and JP-A-2003-203348 and JP-A-2002-25222.

In the above-described configurations according to the related, the first recording layer for recording substantial information and the second recording layer for forming a visible image are provided very close to each other. As a result, when a high power laser is used for purposes such as increasing recording density or recording speed by the use of a short wavelength laser such as a red laser or blue laser, the first and second layers may be adversely affected. Specifically, when a visible image is formed on the second recording layer using emission at high power from a short wavelength laser, information on the first recording layer may be destroyed.

SUMMARY OF THE INVENTION

It is an object of the invention to solve the above-described problem in the related art and to provide an optical disk on which destruction of information and destruction of a visible image can be prevented even when a high power laser is used.

In order to solve the above-described problem, an optical disk comprises a first recording layer, recoding digital information and a second recording layer on which a visible image can be displayed, both of the first and second recording layers being irradiated with light to record data and to display an image, wherein the first recording layer and the second recording layer are spaced from each other by at least 0.5 mm in the direction of the thickness of the disk.

As described above, according to the invention, the first recording layer for recording information and the second recording layer for recording a visible image are provided at a predetermined interval from each other. As a result, even when data or an image is recorded on the first or second recording layer using a high power laser, it is possible to suppress any adverse effect on the other recording layer.

In order to solve the above-described problem, there is provided an optical disk device in which an optical disk having a first recording portion for recording information and a second recording portion allowing display of a visible image is mounted and which is capable of performing at least either recording or reproduction of information at the first recording portion and capable of displaying a visible image at the second recording portion. The optical disk device comprises a first light source, a second light source emitting light having a wavelength longer than that of the first light source, light receiving means, and an optical member for guiding light emitted by the first light source and the second light source to the optical disk and for guiding at least a part of light reflected by the optical disk to the light-receiving means. A visible image is formed at the second recording portion with the first light source.

As described above, according to the invention, a visible image is recorded on a label surface of an optical disk using a laser loaded on an optical disk device. Specifically, a digital signal is recorded on an optical disk having at least a layer which is made of a material whose color changes as a result of a reaction with light emitted by a laser diode and which is located near a surface opposite to a data recording surface, the recording being performed using an optical disk device having an optical pickup with an actuator for emitting laser light having a shade substantially between blue and violet and focusing the laser light near the surface of the optical disk. It is thus possible to provide an optical disk device with a label printing function at a low cost while solving the important problem of an offset of an objective lens thereof.

DESCRIPTION OF THE DRAWINGS

FIGS. 4A to 4C are schematic sectional views of optical disks in compliance with various standards in the embodiment of the invention.

DESCRIPTION OF THE PREFERRED EMBODIMENTS

Figure 1:
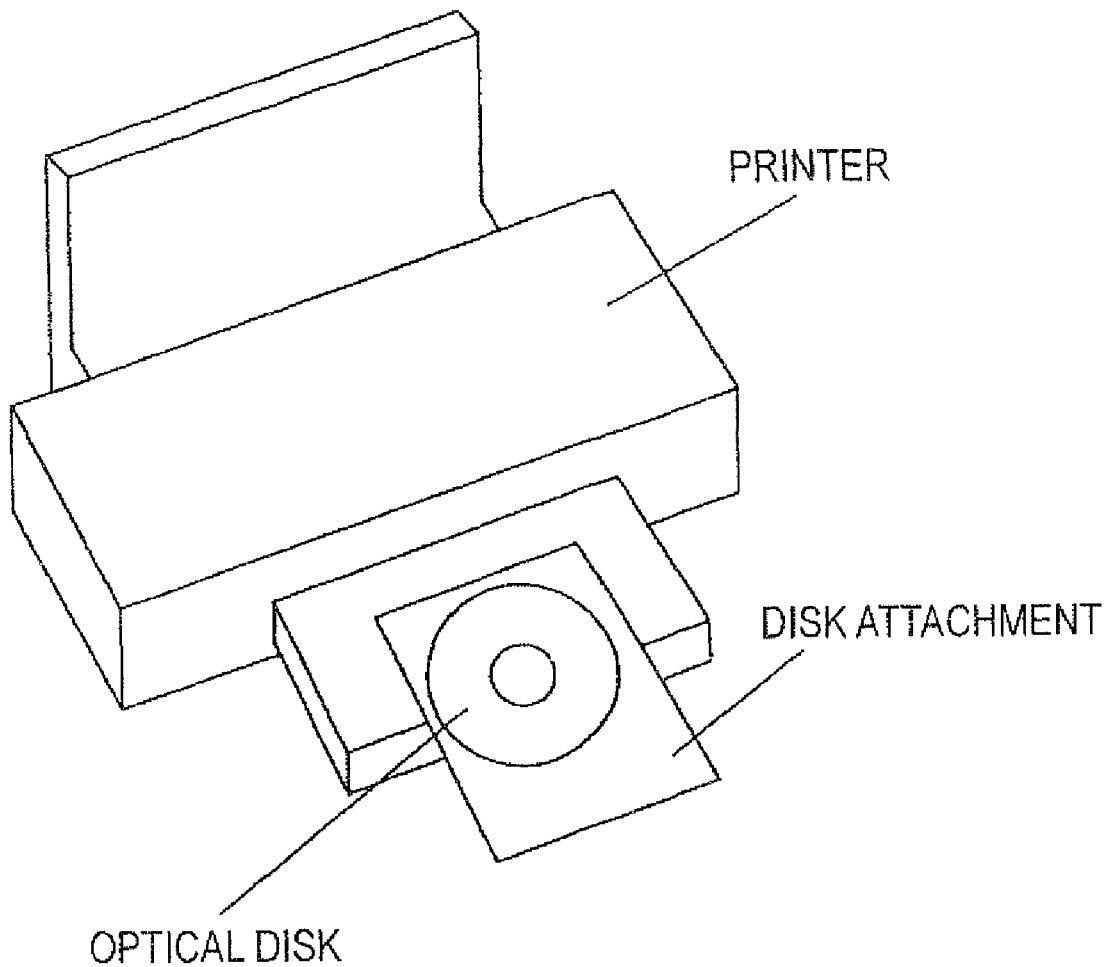
FIG. 1 is a schematic view of a printer having a function of printing a label on an optical disk according to the related art.
Figure 2:
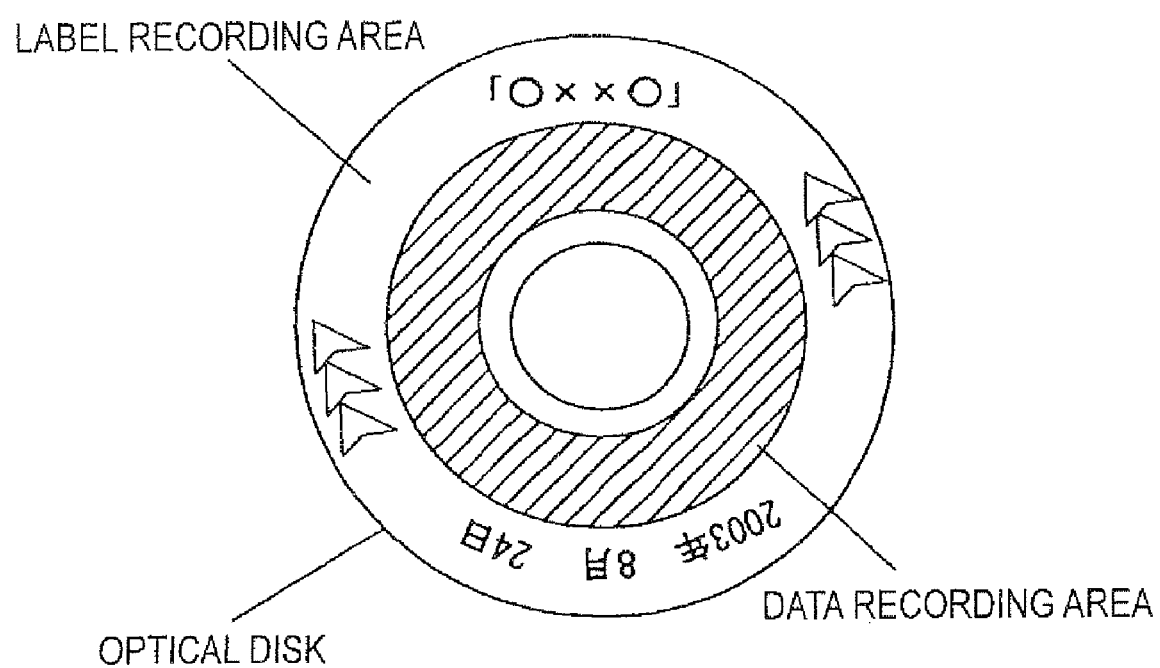
FIG. 2 is a schematic view of an optical disk having a label recorded on an optical disk data recording surface according to the related art.

The invention provides an optical disk characterized in that it comprises a first recording layer for recoding digital information and a second recording layer on which a visible image can be displayed; both of the first and second recording layers are irradiated with light to record data and to display an image; and the first recording layer and the second recording layer are spaced from each other by at least 0.5 mm in the direction of the thickness of the disk. Even when information is recorded or an image is formed on one of the recording layers using a high power laser, it is possible to suppress any influence on the other.

The invention provides an optical disk characterized in that the first recording layer and the second recording layer are spaced from each other a distance equal to or greater than one half of the thickness of the disk. It is therefore possible to reliably suppress any influence of one of the recording layers on the other.

The invention provides an optical disk characterized in that recording can be performed on the second recording layer using light having a wavelength of 480 nm or less. Thus, an image can be recorded using a blue laser.

The invention provides an optical disk characterized in that recording can be performed on the first recording layer using light having a wavelength substantially equal to longer than that of red or a wavelength substantially equal to or shorter than that of blue.

The invention provides an optical disk device in which an optical disk having a first recording portion for recording information and a second recording portion allowing display of a visible image is mounted and which is capable of performing at least either recording or reproduction of information at the first recording portion and capable of displaying a visible image at the second recording portion, characterized in that it comprises a first light source, a second light source emitting light having a wavelength longer than that of the first light source, light receiving means, and an optical member for guiding light emitted by the first light source and the second light source to the optical disk and for guiding at least a part of light reflected by the optical disk to the light-receiving means and in that a visible image is formed at the second recording portion with the first light source. Since a visible image is formed on the second recording layer with the first light source having a shorter wavelength, it is possible to employ a small numerical aperture and to position the optical member at a small distance to the optical disk. Thus, a preferable image can be formed on the second recording portion provided near the surface of the optical disk.

The invention provides an optical disk device in which the first light source emits light having a short wavelength equal to or smaller than that of blue. Information can be recorded at a high density on the first recording portion of the optical disk, and information can be read from the same portion.

The invention provides an optical disk device in which the second light source comprises a plurality of light sources emitting beams of light having wavelengths different from each other. More specifically, in the third aspect of the invention, there is provided an optical disk device characterized in that the second light source emits substantially red light and substantially infrared light. For example, the device can emit infrared light which is effective for CDs and red light which is effective for DVDs. It is therefore possible to perform at least either recording or reproduction of information on various optical disks.

The invention provides an optical disk device in which the second light source comprises a mono-block and in which light having two different wavelengths is emitted by the mono-block. As a result, the device can be provided with a size smaller than that in the case where separate light sources are provided.

The invention provides an optical disk device in which at least either recording or reproduction of information is performed at the first recording portion of the optical disk with the first light source and in which only either recording or reproduction of information is performed at the first recording portion with the second light source. It is possible to employ a small numerical aperture and to position the optical member at a small distance to the optical disk. Thus, a preferable image can be formed on the second recording portion provided near the surface of the optical disk.

The invention provides an optical disk device comprising rotation driving means which rotates the optical disk, a carriage on which at least the first light source, the second light source, and an optical member are mounted and movably held, and movement driving means which is a source of driving of the carriage. Thus, image formation and at least either recording or reproduction of information can be reliably performed.

The invention provides an optical disk in which the optical member includes an objective lens and wherein the objective lens is held such that it can move within a predetermined range to converge light traveling toward the optical disk with the objective lens. When an image is formed at the second recording portion of the optical disk with the first light source, the image can be formed without providing a great working distance for the objective lens.

The invention provides an optical disk characterized in that it comprises an optical pickup for radiating the laser light to the optical disk which is formed with a thermosensitive layer at least on a surface thereof different from an information recording surface to record a visible image on the layer as a result of a reaction with the laser light, objective lens moving means which moves an objective lens for guiding the laser light to the thermosensitive layer of the optical disk, a spindle motor for rotating and controlling the optical disk, and chucking means which holds the optical disk with the thermosensitive layer thereof faced with the optical pickup. The optical disk device is also characterized in that: the optical pickup has a thickness h that satisfies $h \leq 0.4H$ where H represents the height of the optical disk device; a disk type identification mark is formed on at least either the information recording surface or the visible image recording surface of the optical disk; it is recognized based on the identification mark that the visible image recording surface and the optical pickup are disposed face-to-face; the objective lens moving means comprises a magnetic circuit; the magnetic circuit is extended in the opposite direction of the position at which the optical disk is set to face the optical pickup; the objective lens is moved to a predetermined position by the objective lens moving means after the type of the optical disk is recognized to automatically set the optical disk and the optical pickup at a distance from each other.

In this configuration, since the above-described problems can be solved by making the maximum use of components and modules constituting an optical disk device according to the related art, a visible image can be recorded on a label surface of a recordable optical disk relatively easily at a low cost using one pickup. Since a pickup having a small thickness is used, a solution may be employed, in which the objective lens is manually moved to a predetermined position along with the pickup instead of using the moving means constituted by the magnetic circuit.

The invention provides an optical disk device for performing recording with laser light on an optical disk on which various types of information can be recorded as digital signals according to an arbitrary standard, characterized in that it comprises an optical pickup for radiating the laser light to the optical disk which is formed with a thermosensitive layer at least on a surface thereof different from an information recording surface to record a visible image on the layer as a result of a reaction with the laser light, objective lens moving means which moves an objective lens for guiding the laser light to the thermosensitive layer of the optical disk, a spindle motor for rotating and controlling the optical disk, and chucking means which holds the optical disk with the thermosensitive layer thereof faced with the optical pickup. The optical disk device is also characterized in that: the optical pickup has a thickness h that satisfies $h \leq 0.4H$ where H represents the height of the optical disk device; the optical pickup and elements incorporated in the spindle motor are disposed in a lowermost part of the optical disk device; a disk type identification mark is formed at least either the information recording surface or the visible image recording surface of the optical disk; it is recognized based on the identification mark that the visible image recording surface and the optical pickup are disposed face-to-face; and the spindle motor is automatically moved up and down to set the optical disk and the optical pickup at a predetermined distance from each other. The optical disk device may be characterized in that a chucking portion of the spindle motor holding the optical disk is moved up and down to set the optical pickup at the predetermined distance.

In this configuration, an optical disk device incorporated in a personal computer may be loaded with an optical pickup for an optical disk device having a thickness a size smaller to create a space in the housing of the device in which the optical disk can be put in positions offset from each other with reference to the optical pickup. Thus, the above-described problems can be solved, and a visible image can be recorded on a label surface of a recordable optical disk relatively easily at a low cost. An alternative solution may be employed, in which spindle motor moving means is provided to allow an optical disk to be manually moved to a predetermined distance from the optical pickup. When an optical disk is manually moved, notification means may be provided for checking the position of the elevating means when the visible image recording surface and notifying the operator of any abnormality of the position, which allows the reliability of the device to be improved.

The invention provides an optical disk characterized in that a temperature sensor is disposed under an optical disk setting plane in the housing of the optical disk device to monitor changes in the temperature in the housing after an optical disk is chucked and to record a visible image on the visible image recording surface using a laser irradiation pattern intended for preheating of the surface when the temperature decreases below a certain prescribed value.

In the mode for carrying out the invention, the use of a laser irradiation pattern mitigates the influence of a decrease in the temperature of a photosensitive/thermosensitive layer on which recording quality is susceptible to the ambient temperature. It is therefore possible to maintain uniform and high printing quality when a visible image is formed on a label surface of a recordable optical disk.

The invention provides an optical disk for performing recording with laser light on an optical disk on which various types of information can be recorded as digital signals according to an arbitrary standard, characterized in that it comprises an optical pickup for radiating the laser light to the optical disk which is formed with a thermosensitive layer at least on a surface thereof different from an information recording surface to record a visible image on the layer as a result of a reaction with the laser light, objective lens moving means which moves an objective lens for guiding the laser light to the thermosensitive layer of the optical disk, a spindle motor for rotating and controlling the optical disk, and chucking means which holds the optical disk with the thermosensitive layer thereof faced with the optical pickup. The optical disk device is also characterized in that: the optical pickup has a thickness h that satisfies $h \leq 0.4H$ where H represents the height of the optical disk device; the optical pickup and elements incorporated in the spindle motor are disposed in a lowermost part of the optical disk device; and an optical pickup for recording a visible image is disposed to radiate laser light toward a position on the visible image forming surface of the optical disk set in the device, the position being substantially in a face-to-face relationship with the optical pickup. The optical disk device is also characterized in that the optical pickup for recording a visible image is controlled using the optical pickup for recording information based on information on the position of the information recording surface of the optical disk and information on the focus of light when a visible image is recorded and in that the numerical aperture of an objective lens mounted on the optical pickup for recording a visible image is 0.4 or less. Further, as an application of the invention to an optical disk device having a small thickness, an optical pickup for forming a visible image may be used, which is characterized in that it includes a laser diode disposed outside a projected area of an optical disk and in that light is guided to an objective lens using an optical fiber.

In this mode for carrying out the invention, the optical pickup can be provided at a cost lower than that of an optical pickup in the related art because it is dedicated for recording of a visible image, although it constitutes an additional component. In addition, the optical pickup for a visible image can be controlled by an optical pickup for recording information based on information on the image recording surface which is addressed according to an existing standard. Since an objective lens having a small numerical aperture is used, the visible image recording surface can be irradiated with laser light that is insensitive to staggers of the optical disk, and the objective lens moving means (actuator) can be deleted from the optical pickup for a visible image. Further, a configuration of a control circuit may be employed such that the information recording surface and the visible image forming surface can be simultaneously irradiated with laser light to reduce time required for recording a visible image significantly.

The invention provides an optical disk for recording information on a label provided on an optical disk using an optical pickup, characterized in that: the label comprises a printing layer and a transparent protective layer; the focus of the optical pickup is controlled using return light which is a part of recording light from the optical pickup reflected by a surface of the protective layer and returned to the optical pickup; and printing is performed on the printing layer by irradiating it with the recording light which has been transmitted by the protective layer.

Since the transparent protective layer having a predetermined thickness is formed on the printing layer, the focus of the optical pickup can be controlled using light which has been mirror-reflected on a surface of the protective layer. It is therefore possible to provide an optical disk device which can print a label surface by controlling the position of the focus of light irradiating the surface even when the printing layer of the label has a small mirror reflection rate.

The invention provides an optical disk wherein the printing layer of the label is a thermosensitive paper which is printed using heat obtained by absorbing at least a part of the recording light and performing thermal conversion of the same, and the protective layer may be a transparent resin coating layer.

Embodiment 1

Figure 3:
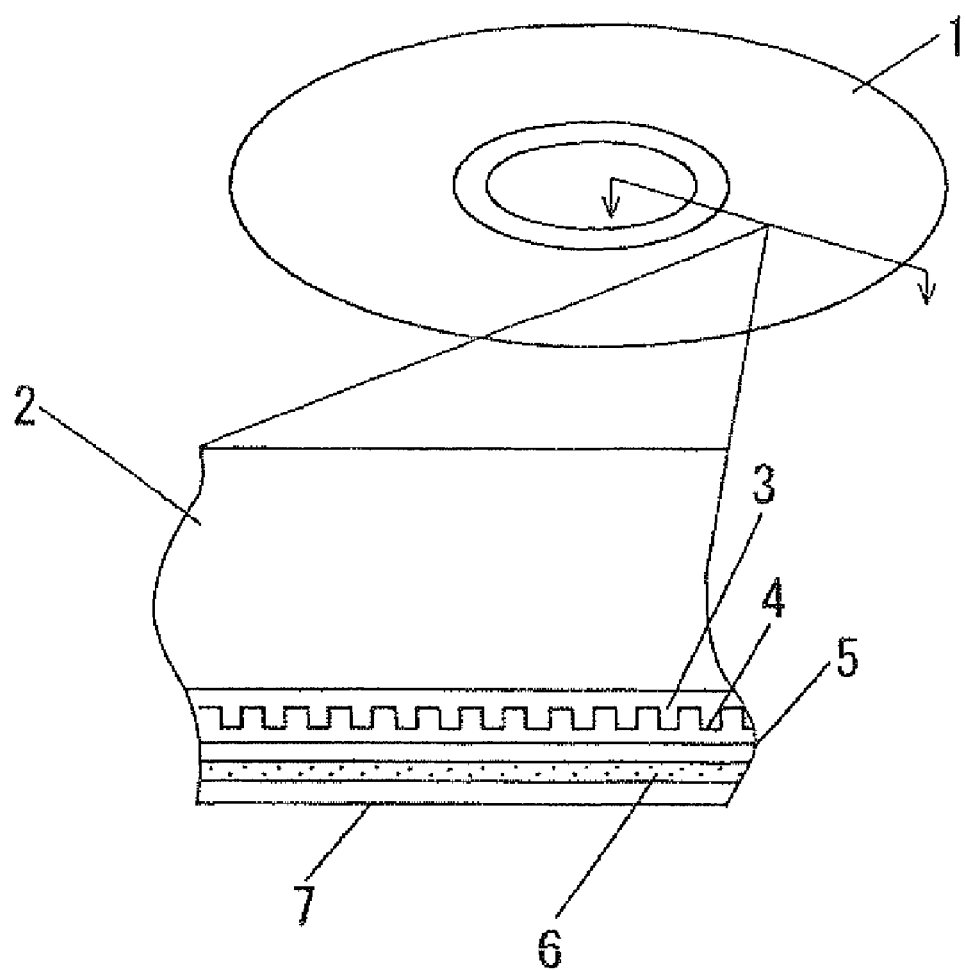
FIG. 3 shows a schematic view of an optical disk in an embodiment of the invention and a partial sectional view of the same.
Figure 5:
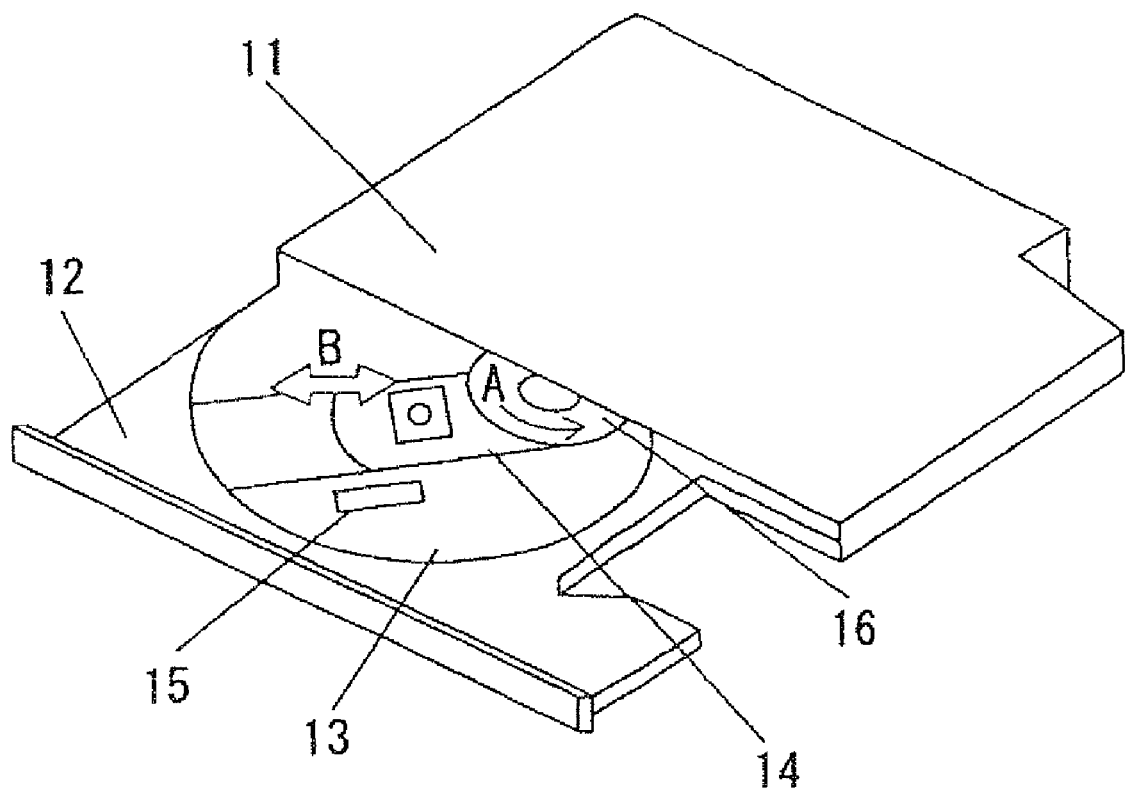
FIG. 5 is a schematic view of an optical disk device in the embodiment of the invention.
Figure 6:
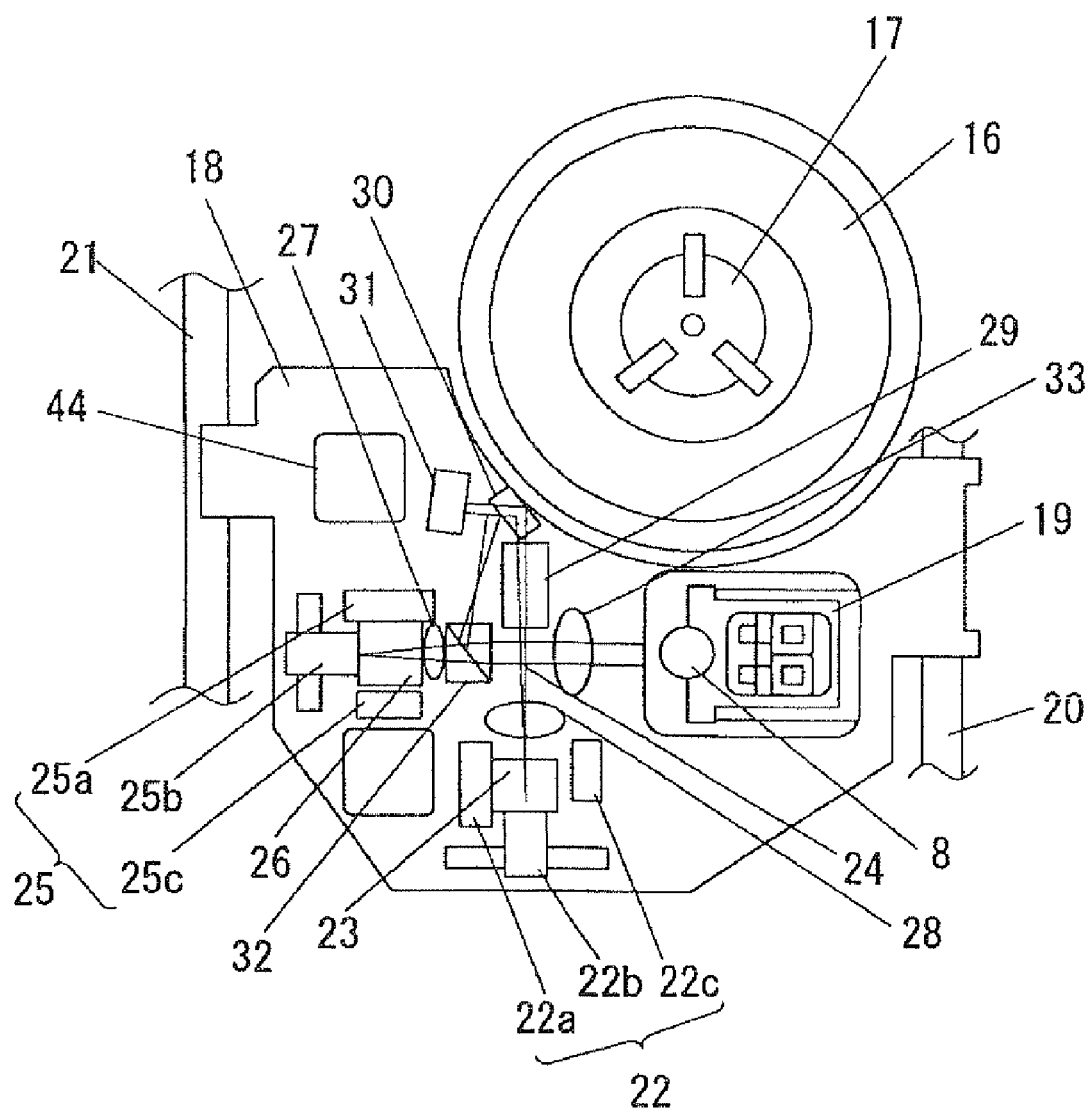
FIG. 6 is a schematic plan view of an optical pickup in the embodiment of the invention.
Figure 7:
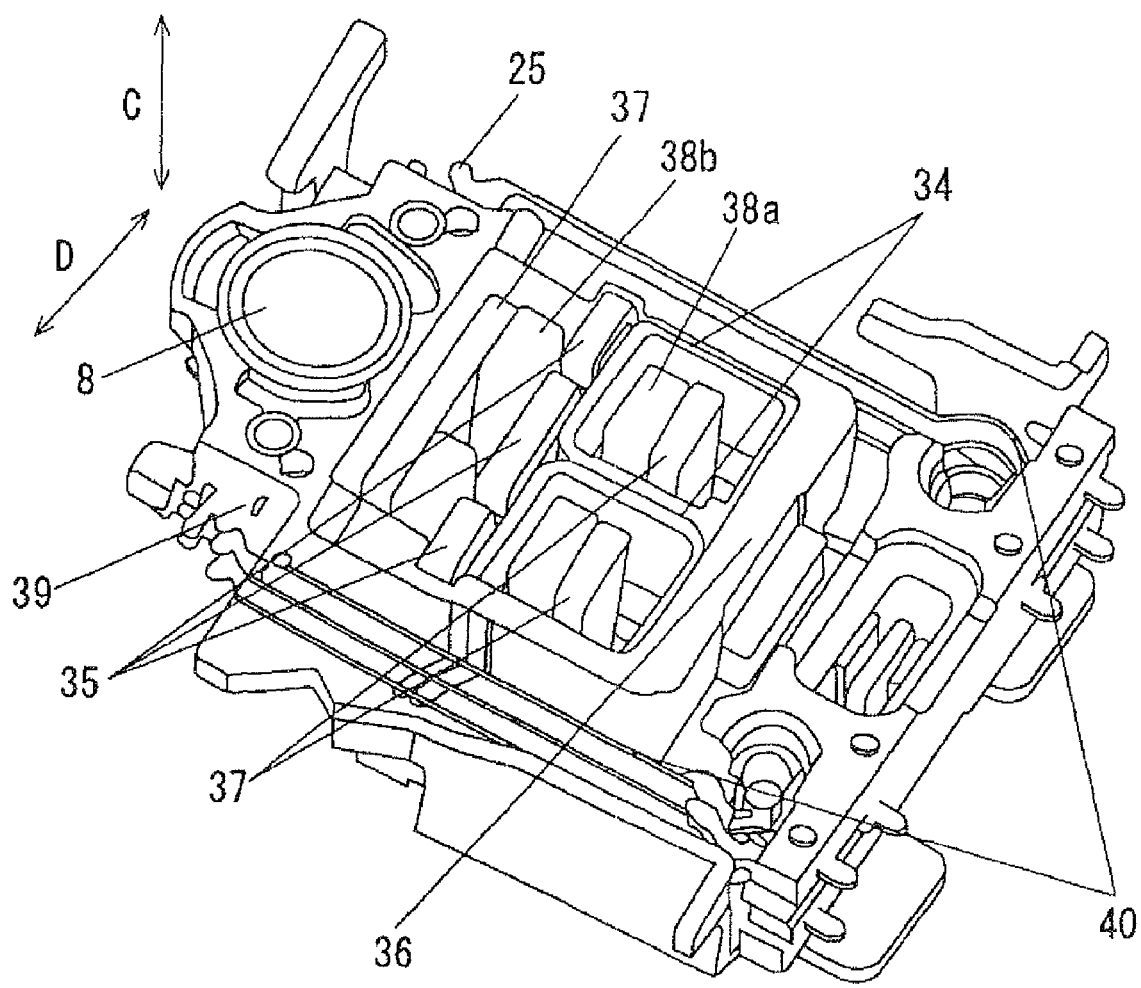
FIG. 7 is a schematic view of an actuator portion of the optical pickup in the embodiment of the invention.
Figure 8:
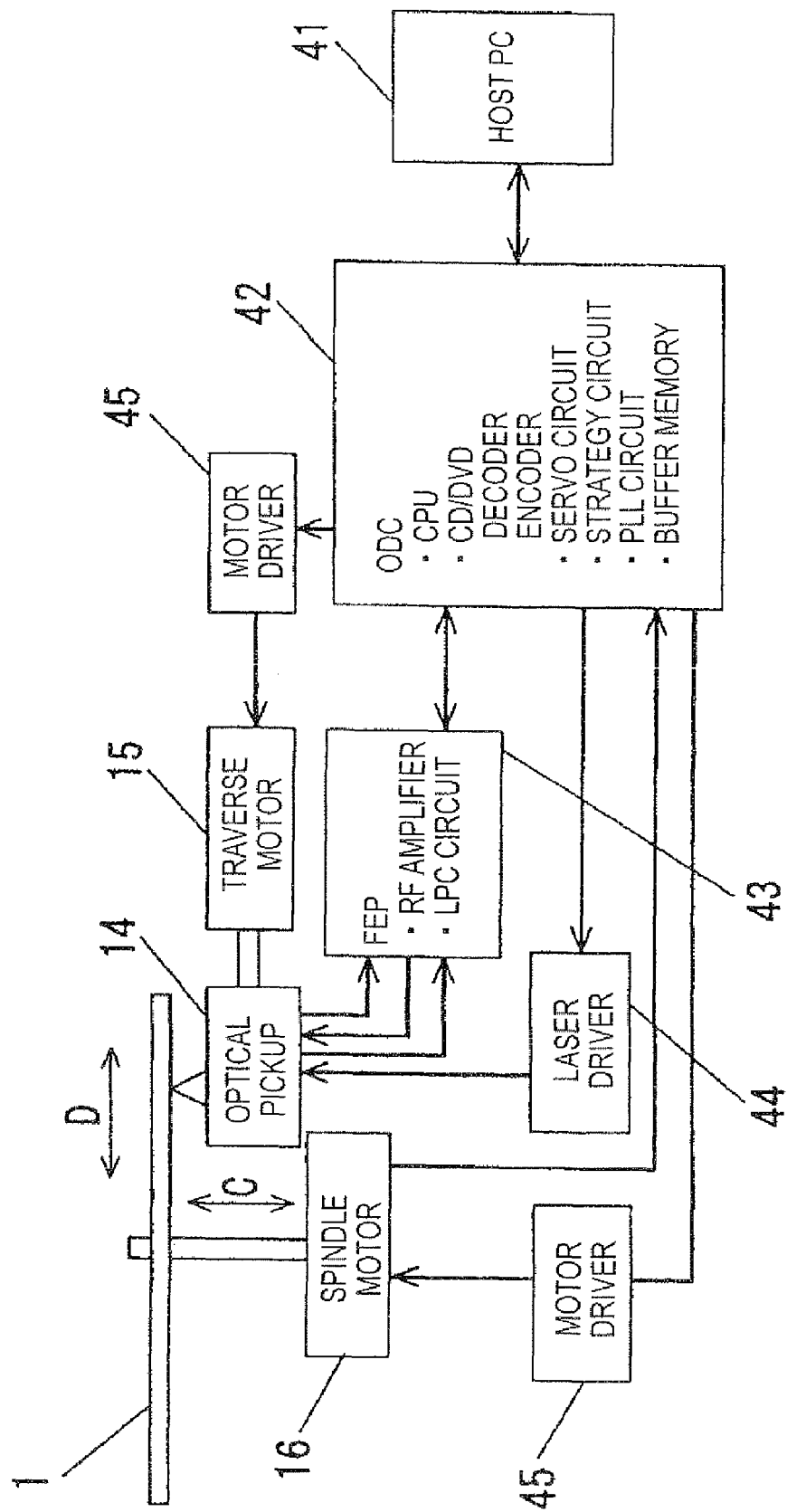
FIG. 8 is a block diagram of the optical disk device in the embodiment of the invention.
Figure 9:
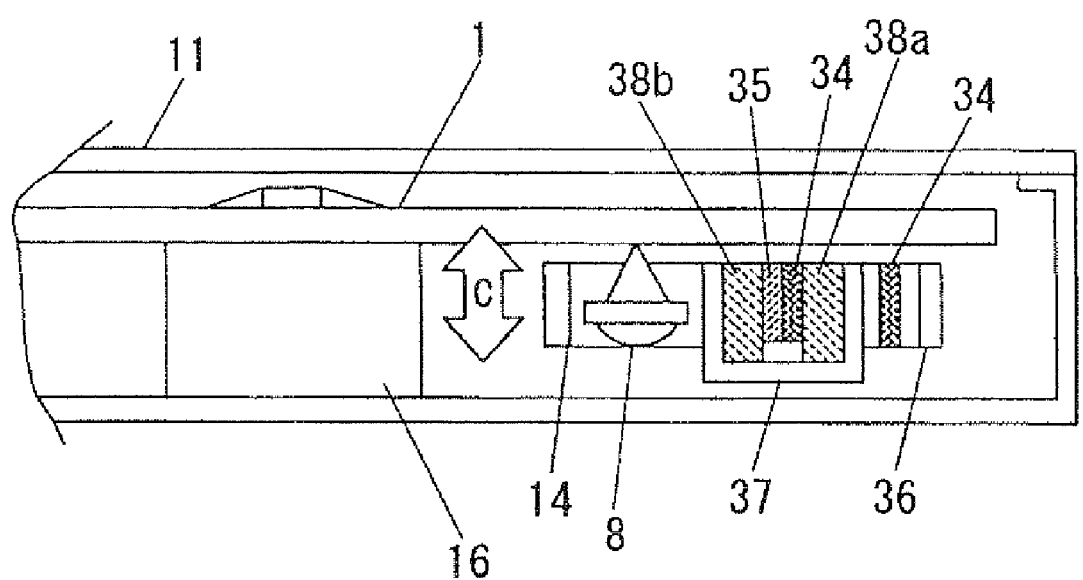
FIG. 9 is a sectional view of the optical disk device in the embodiment of the invention.

An optical disk device according to Embodiment 1 of the invention will now be described with reference to the drawings. FIG. 3 shows a schematic view and a partial sectional view of an optical disk in the embodiment of the invention. FIGS. 4A to 4C are schematic sectional views of optical disks according to various standards in the embodiment of the invention. FIG. 5 is a schematic view of the optical disk device in the embodiment of the invention. FIG. 6 is a plan view of an optical pickup in the embodiment of the invention. FIG. 7 is a schematic view of an actuator portion of the optical pickup in the embodiment of the invention. FIG. 8 is a block diagram of the optical disk device in the embodiment of the invention. FIG. 9 is a schematic sectional view of the optical disk device in the embodiment of the invention.

FIG. 3 shows an example of an optical disk 1 and a schematic sectional view of a part of the same. Referring to the partial sectional view, the optical disk 1 has a substrate 2 made of a resin such as polycarbonate; a data recording layer 4 (first recording portion) including a groove (guide groove) 3, the layer being a reversible type which reacts with a particular wavelength and whose reflectivity consequently changes as a result of a phase change or melting or an irreversible type on which data cannot be rewritten; a radiating layer 5 for efficiently conducting and releasing heat at the time of laser irradiation to the surroundings; a label (photosensitive/thermosensitive) layer 6 (second recording portion) which reacts with a particular wavelength to be colored when a label surface is irradiated with a laser; and a label surface cover layer 7 for protecting the label layer 6. The label layer 6 used may be a write-once type which is irreversible in that an image can be formed only once or a reversible type on which an image formed at a first temperature (wavelength) can be erased at a second temperature (wavelength) different from the first temperature (wavelength). The configuration of the layers is merely a typical example, and the thickness of each of the layers may be different from that illustrated. The present embodiment refers to an example of recordable CDs which are the most selling optical disks in the market, and the example has a layer configuration different from that of recordable DVDs.

Desired digital data is recorded on the optical disk 1 after mounting the disk in an optical disk device. In the case of the optical disk device described in the present embodiment of the invention, the optical disk 1 may be turned upside down in the optical disk 1 after data is recorded to record visually perceivable characters and images on a label surface (opposite to the recording surface) of the optical disk 1 using laser light emitted by a laser diode mounted in an optical pickup of the optical disk device. A description will be made below on a configuration of the optical disk 1 in compliance with each of various optical disk standards, and the optical disk device and the optical pickup will be detailed later.

FIGS. 4A to 4C show optical disks 1, which allow recording on a label thereof, in compliance with various optical disk standards, and the figures schematically show how a data recording layer and a label recording layer in compliance with each physical standard are disposed relative to each other during data recording and during recording on a label. The examples have been chosen from CDs, DVDs, and optical disks adapted to short wavelengths (optical disks on which at least either recording or reproduction of information can be performed using light having a wavelength shorter than the wavelength of blue) presently available on the market as optical disks on which data can be recorded and which have a diameter of 12 cm. Positional relationships between data recording layers and label recording layers of the disks in compliance with the CD standard, the DVD standard, and the standard for optical disks adapted to short wavelengths are shown in FIGS. 4A, 4B, and 4C, respectively.

Referring to a disk 1a in compliance with the CD standard shown in FIG. 4A, which is similar to that shown in FIG. 3, laser light which has exited an objective lens 8 passes through a polycarbonate substrate 2 and comes into focus on a data recording layer 4a in a position farthest from the objective lens 8 among the examples to record data on the layer. A label layer 6a for recording visually perceivable characters and images is disposed in a position farther than the data recording layer 4a or closer to the a label surface on the opposite side of the disk. When recording is performed on a label according to the invention, desired characters and images are recorded using laser light whose focus position is set in the vicinity of the surface of the label, i.e., laser light having a wavelength shorter than the wavelength of blue. In this case, the data recording layer 4a and the label recording layer 6a are very close to each other, the layers may affect each other when high laser power is used. That is, FIG. 4A shows an optical disk similar to those in the related art.

A disk 1b in compliance with the DVD standard shown in FIG. 4B is an optical disk having a thickness of 1.2 mm created by combining two substrates having a thickness of 0.6 mm. A data recording layer 4b is disposed at a depth of 0.6 mm from a surface of the DVD standard disk 1b. A label layer 6b in the present embodiment is disposed in a position close to the label surface similarly to the label layer 6a. When recording is performed on a label according to the invention, desired characters and images are recorded using laser light whose focus position is set in the vicinity of the surface of the label, i.e., laser light having a wavelength shorter than the wavelength of blue in this mode of the present embodiment. In this case, the data recording layer 4b and the label recording layer 6b are spaced from each other a distance on the order of one half the thickness of the optical disk or a distance in the range from 0.5 mm to 0.6 mm, and the layers will not affect each other even when high laser power is used. In this mode of the present embodiment, the data recording layer 4b is provided in the middle of the optical disk when viewed in the direction of the thickness of the disk, and the label recording layer 6b is disposed near a surface of the same. In this mode of the present embodiment, the label layer 6b and the data recording layer 4b may alternatively be disposed in the middle of the optical disk when viewed in the direction of the thickness of the disk, and the laser power may be increased when recording is to be performed at a high speed or high density. In such a configuration, however, data on the data recording layer 4b may be destroyed, for example, when a visible image is formed on the label layer 6b. Therefore, a simple configuration in which the label layer 6b and the data recording layer 4b are disposed at a predetermined interval from each other is employed as described above, which makes it possible to prevent the destruction of data on one of the layers because of the other layer.

In an optical disk 1c adapted to short wavelengths shown in FIG. 4C, a data recording layer 4c is disposed in a position of about 0.1 mm from a surface of the disk. A label layer 6c in the present embodiment is disposed in a position close to a label surface that is the opposite surface of the disk. When recording is performed on a label according to the invention, desired characters and images are recorded using laser light whose focus position is set in the vicinity of the surface of the label, i.e., laser light having a wavelength shorter than the wavelength of blue in this mode of the present embodiment. In this case, the data recording layer 4c and the label recording layer 6c are spaced from each other a distance on the order of the thickness of the optical disk or a distance in the range from 0.8 mm to 1.1 mm, and the layers will not affect each other even when high laser power is used. In the present embodiment, the data recording layer 4c is provided near one principal surface of the optical disk, and the label recording layer 6c is disposed near another principle surface of the same. In this mode of the present embodiment, the label layer 6c and the data recording layer 4c may alternatively be disposed near one of the principal surfaces of the optical disk, and the laser power may be increased when recording is to be performed at a high speed or high density. In such a configuration, however, data on the data recording layer 4c may be destroyed, for example, when a visible image is formed on the label layer 6c. Therefore, a simple configuration in which the label layer 6c and the data recording layer 4c are disposed at a predetermined interval from each other is employed as described above, which makes it possible to prevent the destruction of data on one of the layers because of the other layer.

The label layers 6 of the CD standard disk 1a, the DVD standard disk 1b, and the optical disk 1c adapted to short wavelengths are preferably disposed at a depth of about 0.1 mm from the label surfaces (or in the vicinity of the surfaces of the optical disks 1. That is, the label layers are disposed at the same depth as that of the data recording layer 4c of the optical disk 1c adapted to short wavelengths which is disposed in the vicinity of the surfaces of the disks. It is therefore possible to easily record visually perceivable characters and images on the label layer of any of the CD standard disk 1a, the DVD standard disk 1b, and the optical disk 1c adapted to short wavelengths without a need for any special modification of an optical pickup according to the related art. That is, when a label layer 6 is disposed in the same position as that in the optical disk 1c adapted to short wavelengths, recording can be easily performed on the label using an optical system for the optical disk 1c adapted to short wavelengths regardless of the standard.

Referring to data recording layers, a dye (coloring matter) that reacts with laser light such as cyanine, phthalocyanine, or azo may be used for a data recording layer 4 in a write-once type optical disk, and a data recording layer 4 of a rewritable optical disk may be formed of a Ge—Sb—Te type or eutectic phase change material. Although a material similar to that of the data recording layer 4 may be used for a label layer 6, since sufficient contrast cannot be achieved in this case, the layer 6 may be formed of a thermosensitive material such as a leuco type material which is colored when heated.

In FIG. 5, reference numeral 11 represents an optical disk device; reference numeral 12 represents a tray; and reference numeral 13 represents a pickup module (hereinafter referred to as PUM) which is loaded with an optical pickup 14, a traverse motor 15, and a spindle motor 16.

When normal data recording is performed, the tray 12 is pulled out from the optical disk device 11, and the optical disk 1 is thereafter mounted on a chucking portion (not shown) the spindle motor 16 such that the data recording surface 4 of the optical disk 1 faces the optical pickup module 3. After the tray 12 is inserted into the optical disk device 11, the optical disk 1 is controlled by the spindle motor 16 for rotation (in the direction of the arrow A), and the optical pickup 14 is controlled by the traverse motor 15 in the radial direction of the optical disk (in the direction of the arrow B). When information is recorded on the optical disk 1, the disk is irradiated with laser light along a groove 3 (see FIG. 3). Therefore, information is recorded by moving the laser light from the optical pickup 14 irradiating the surface of the polycarbonate substrate 2 of the optical disk 1 along the groove 3.

When a visible image is to be formed on a surface of the label layer 6 of the optical disk 1, the optical disk 1 is set in a chucking portion 17 (see FIG. 6) of the spindle motor 16 such that the surface of on the side of the label surface cover layer 7 faces the optical pickup 14 of the optical disk device 11. The optical disk 1 and the optical pickup 14 are controlled by the spindle motor 16 and the traverse motor 15 to irradiate the label layer 6 with laser light according to the visible image to be formed, whereby the desired visible image is formed on the label layer 6.

In FIG. 6, reference numeral 16 represents a spindle motor for rotating the optical disk 1, and the motor has the chucking portion 17 which holds the optical disk 1. The spindle motor 16 rotates the optical disk 1 at a constant angular velocity or rotates the disk at a variable angular speed. While the spindle motor 16 is used as means for rotating and controlling the optical disk 1 in the present embodiment, the disk may be rotated and controlled using a motor of a different type or a different actuator.

Reference numeral 14 represents an optical pickup for recording digital information on the optical disk 1 and reading information from the optical disk 1 by irradiating the optical disk 1 with laser light. Reference numeral 18 represents a carriage which serves as a base of the optical pickup 14, and reference numeral 19 represents an optical pickup actuator for moving the objective lens 8 substantially on a three-dimensional basis. The carriage 18 is supported by at least a support shaft 20 and a guide shaft 21, and it can be moved between the inner circumference and the outer circumference of the optical disk 1. The optical pickup 19 and an optical portion or light source (laser diode) are mounted on the carriage 18.

Reference numeral 22 represents an optical integrated element (for an optical disk adapted to short wavelengths) including a violet laser portion 22b, a light-receiving element 22a, and a front optical monitor portion 22c, and the laser portion 22b has a laser diode which generates laser light having a wavelength of about 405 nm. Although a laser diode emitting violet light is used in the present embodiment, a laser diode emitting light in a shade between blue and purple may alternatively be used. A preferably used laser diode emitting such laser light having a short wavelength is a diode provided by sandwiching an active layer obtained by doping GaN with light emission centers such as In between a p-type layer mainly composed of GaN and doped with a p-type impurity and an n-type laser mainly composed of GaN and an n-type impurity. That is, a so-called nitride semiconductor laser is preferably used.

Reference numeral 23 represents a prism which is directly mounted on the laser portion 22b using a process such as bonding and which transmits laser light 24 emitted by the laser diode to irradiate the optical disk 1 with the light and guides return light from the optical disk 1 to the light-receiving element 22a. A polymeric film for monitoring the laser light 24 is provided on the prism 23 to provide a configuration in which a part of the laser light 24 can be reflected to the front optical monitor 22c to monitor the power level of the laser light 24. Further, a diffraction grating (not shown) is provided to split the laser light 24 having a wavelength of about 405 nm after the light is guided toward the light-receiving element 22a, which makes it possible to detect the focus, tracking, and spherical aberration of the light and to detect signals recorded on the optical disk 1 and control signals.

The light-receiving element 22a is covered by a transparent substrate on a surface thereof. Terminals are exposed on the surface for electrical connection of the light-receiving element. Obviously, the light-receiving element 22a may alternatively be covered by a transparent member which is not degraded by a wavelength of 405 nm (light having a shade between blue and violet).

Reference numeral 25 represents an optical integrated element (for CDs/DVDs) having red/infrared laser portion 25b, a light-receiving element 25a, and a front optical monitor 25c. The laser portion 25b includes a laser diode which emits laser light having a wavelength of about 660 nm and a laser diode which emits a laser light having a wavelength of 780 nm, and those laser diodes are disposed in a space inside the laser portion 25b.

In the present embodiment, the laser diodes are constituted by separate light-emitting blocks disposed in the space. Alternatively, a plurality of light-emitting layers may be provided on a single light-emitting block, and the single light-emitting block may be disposed in the space. Although two laser diodes having different wavelengths are provided in the present embodiment, three or more laser diodes having different wavelengths may alternatively be disposed in the space.

Reference numeral 26 represents a prism which transmits laser light 27 and guides return light to the light-receiving element 25a. A polymeric film is provided on the prism 26 to provide a configuration in which a part of the laser light 27 can be reflected to the front optical monitor 25c to monitor the power level of the laser light 27. Further, a diffraction grating (not shown) is provided to split the laser light having a wavelength of 780 nm after the light is guided toward the light-receiving element 25a, which makes it possible to detect the focus, tracking, and spherical aberration of the light and to detect signals recorded on the optical disk 1 and control signals. The prism 26 is provided with inclined surfaces substantially in parallel with each other, and an optical element such as a beam splitter film or a hologram is disposed on the inclined surfaces.

Light emitted by either of the two laser diodes included in the laser portion 25b passes through the prism 26 to be guided to the optical disk 1, and light reflected by the optical disk 1 passes through the prism 26 to be guided to the light-receiving element 25a. At this time, the reflected light from the optical disk 1 is reflected between the two inclined surfaces in the prism 26 to be guided to the light-receiving element 25a.

Reference numeral 28 represents a collimate lens for the wavelength of 405 nm which is used for converting the divergent laser light 24 output from the optical integrated element 22 (for an optical disk adapted to short wavelength) into substantially parallel light. The collimate lens 28 also has a function of correcting chromatic aberration that is caused by effects of a wavelength variation and a temperature change. Reference numeral 30 represents a beam shaping prism which corrects the intensity distribution of the laser light 24 into a substantially circular shape. Reference numeral 31 represents an aberration correcting mirror which is used to correct spherical aberration caused by an error in the thickness of the optical disk 1.

Reference numeral 32 represents a beam splitter which separates and combines the laser light 24 and the laser light 27 emitted by the optical integrated element 22 (for an optical disk adapted to short wavelengths) and the optical integrated element 25 (for CDs and DVDs), respectively, and which is phase-matched with the laser light 24.

Reference numeral 33 represents a convex lens. After passing through the convex lens 33, the laser light 24 and the laser light 27 pass through an upward prism (not shown) and exits the objective lens 8 toward the optical disk 1. The objective lens 8 is an objective lens to be used for optical disks, which is adapted to wavelengths in the range from 390 nm to 430 nm (405 nm in the present embodiment), i.e., disks for short wavelengths, wavelengths in the range from 600 nm to 700 nm (660 nm in the present embodiment), i.e., DVDs, and wavelengths in the range from 750 nm to 800 nm (780 nm in the present embodiment), i.e., CDs. While the objective lens 8 which accommodates three wavelengths alone is described by way of example in the present embodiment, two or more separate lenses may be provided to accommodate the different wavelengths in order to facilitate optical designing. For example, an objective lens as used in a DVD drive according to the related art may be used for both of the wavelengths of 660 nm (DVDs) and 780 nm (CDs), and a dedicated objective lens may be used for optical disks adapted to short wavelengths for which a large numerical aperture must be employed. The two objective lenses may be driven by a single actuator.

FIG. 7 shows an optical pickup actuator 19 for moving the objective lens 8 of the optical pickup 14 in a direction C vertical to the optical disk 1 and in a direction D radial to the same. In FIG. 7, a focus actuator 34 is a winding substantially in the form of a ring, and a tracking actuator 35 is also a winding substantially in the form of a ring. The focus actuator 34 and the tracking actuator 35 are secured to an objective lens holding member 36 with an adhesive. A magnetic yoke 37 forms a magnetic circuit in combination with a focus magnet 38a and a tracking magnet 38b. A spring substrate 39 is supplied with power from suspension wires 40 each of which has conductivity, and the substrate is used as a relay substrate for allowing bonding with the objective lens holding member 36. The suspension wires 40 are soldered to the spring substrate 39 at one end thereof, and the focus actuator 34 and the tracking actuator 35 are also secured to the suspension wires 40 by soldering them to the spring substrate 39. Further, the spring substrate 39 is secured to the objective lens holding member 36 with an adhesive. The suspension wires 40 comprise at least six round wires or plate springs such that power can be supplied to the tracking actuator 35 that is series-connected to the focus actuator 35. The optical disk device 11 of the present embodiment has a general configuration as described above.

FIG. 8 is a block diagram showing the configuration of the optical disk device according to the present embodiment of the invention. As shown in the same figure, the optical disk device is connected to a host PC 41, and the device has the optical pickup 14, the traverse motor 15, the spindle motor 16, a servo circuit, an ODC (Optical Disk Controller) 42 incorporating a CD/DVD encoder/decoder, a CPU, a strategy circuit, a PLL (Phase Locked Loop) circuit, and a buffer memory, an FEP (Front End Processor) 43 incorporating an RF (Radio Frequency) amplifier and a laser power control circuit, a laser driver 44, and a motor driver 45 for the traverse and spindle motors.

The spindle motor 16 is a motor for holding and rotating the optical disk 1 on which data is to be recorded, and the speed of rotation of the motor is controlled by the servo circuit. The optical pickup 14 is a unit which irradiates the optical disk 1 rotated by the spindle motor 16 with laser light. The objective lens 8 is held by the focus actuator 34 and the tracking actuator 35 at the optical pickup actuator 19 as shown in FIG. 7, and the lens can be moved relative to the optical disk 1 in a face-to-face relationship therewith in the direction C vertical to the surface of the optical disk 1 and in the direction D radial to the optical disk 1. The focus actuator 34 and the tracking actuator 35 move the objective lens 8 relative to the optical disk 1 in the vertical direction C and the radial direction D according to a focus error signal and a tracking error signal, respectively, supplied from the servo circuit. The servo circuit generates the focus error signal and the tracking error signal based on a light-reception signal obtained from light reflected by the optical disk 1 when irradiated by the laser, and the objective lens 8 is moved as described above to perform focus control and tracking control.

The RF amplifier (see FIG. 6) amplifies an RF signal supplied from the optical pickup 14 and outputs the amplified RF signal to the ODC 42 incorporating the servo circuit and the decoder. During reproduction, the CD/DVD decoder performs EFM modulation on the RF signal supplied by the RF amplifier to generate reproduction data. The buffer memory accumulates information to be recorded on a recording surface of the optical disk 1 (hereinafter referred to as data for information recording) supplied from the host PC 41 and information associated with a visible image to be formed on the label surface of the optical disk 1 (hereinafter referred to as visible image data). The data for information recording accumulated in the buffer memory is output to the encoder, and the visible image data is output to the controller. The encoder modulates the data to be recorded supplied from the buffer memory and outputs the resultant data to the strategy circuit at which the signal supplied from the encoder is subjected to a time-base correcting process and is then output to the laser driver 44. The laser driver 44 drives the laser diode of the optical pickup 14 according to the signal from the strategy circuit which has been modulated according to the data to be recorded under the control of an LPC circuit. The LPC circuit, which is incorporated in the FEP 43, controls the power of laser light radiated by the laser diode of the optical pickup 14. Specifically, the LPC circuit controls the laser driver 44 such that the optical pickup 14 radiates laser light having a value that agrees with a target value for optimum laser power instructed by the ODC 42. Visible image data supplied from the host PC 41 are sequentially stored in the buffer memory incorporated in the ODC 42 through the CPU. When the host PC 41 creates the visible image data to be formed on the label surface of the optical disk 1 in the bitmap format that is commonly used, the bitmap data is converted into data in the form of polar coordinates, and the converted image data is transmitted from the host PC 41 to the optical disk device 11.

When a visible image is formed on the label surface of the optical disk 1 based on the visible image data supplied as described above, the laser power is at a high level at which recording is performed by changing the color of the label layer 6. There is also a low level at which substantially no change occurs on the photosensitive/thermosensitive layer of the optical disk 1 when the label layer 6 is irradiated and at which the position of the optical pickup 14 can be controlled by continually monitoring reflected light. Since the position of the optical pickup 14 may be controlled without using reflected light, the low level mode may be deleted.

The traverse motor 15 is a motor for moving the optical pickup 4 in the radial direction D of the optical disk 1. The motor driver 45 drives the traverse motor 5 by an amount according to a signal supplied by the ODC 42. According to a movement start instruction including the direction and amount of a radial movement of the optical pickup 14, the ODC 42 generates a pulse signal in accordance with the amount and direction of the movement and outputs it to the motor driver 45. The spot irradiated by laser light from the optical pickup 14 can be moved to various positions on the optical disk 1 by moving the optical pickup 14 in the radial direction of the optical disk 1 with the traverse motor 15 and rotating the optical disk 1 with the spindle motor 16, and those elements constitute the irradiated position adjusting means.

The ODC also comprises a CPU (Central Processing Unit) and a RAM (Random Access Memory), and it is configured to drive each part of the optical disk device according to a program stored in a ROM and to perform centralized control over the process of recording data on the recording surface of the optical disk 1 and the process of forming a visible image on the thermosensitive surface of the optical disk 1.

Operations of the optical disk device having the above-described configuration will now be described. As described above, the optical disk device is configured such that it can record information such as audio/video data and PC data supplied from the host PC 41 on a data recording surface of an optical disk 1 and such that it can form a visible image associated with image data supplied from the PC 41 on the label surface 6 of the optical disk 1.

A description will now be made on operations of the optical disk device which is capable of processes such as information recording and formation of a visible image.

First, when an optical disk 1 is set in the optical disk device, the optical pickup 14 is controlled to determine which of the data recording surface and label surface of the optical disk 1 thus set faces the optical pickup 14. An identification mark that is unique to the label surface may be provided as a reference for such a determination, and a simpler method may alternatively be employed in which the discrimination between the data recording surface and the label surface is made with reference to existing standards for CDs, DVDs, and optical disks adapted to short wavelengths. In any case, when the data recording surface is in a face-to-face relationship with the optical pickup 14, the optical disk 1 and the optical pickup 14 are driven and controlled with the spindle motor 16 and the traverse motor 15 in accordance with the standard that applies to the set optical disk 1 using a method similar to that in recordable optical disk devices in the related art. At this time, the laser diode having the wavelength according to each of the optical disk standard is made to emit light. Specifically, laser beams of 780 nm, 650 nm, and 405 nm are emitted by the respective laser diodes for a CD, a DVD, and an optical disk adapted to short wavelengths, respectively, and the beams are focused on the data recording surface of the optical disk 1 through the objective lens 8 (see FIG. 3).

When the disk is set with the label surface thereof faced with the optical pickup 14, the laser diode having the wavelength of 405 nm is made to emit light, which is then focused on the label layer 6, regardless of the standard that applies to the optical disk. The label layer 6 of the optical disk 1 described in the present embodiment is disposed near the label surface (at a depth of about 0.1 mm) regardless of the standard that applies to the optical disk. In the case of the standard for optical disks adapted to short wavelengths utilizing a wavelength of 405 nm, since the data recording layer 4 is disposed near a surface of the optical disk 1 (at a depth of about 0.1 mm), this system (optical pickup actuator 19) can be used as a system for recording on a label substantially without any change on the same. Recording can be performed on the label while driving an actuator according to the related art as shown in FIG. 9. When no system is prepared for focusing light on a disk surface as in the case of an optical disk adapted to short wavelengths, the distance from the objective lens 8 mounted on the optical pickup 14 to the label layer 6 of the optical disk 1 facing the lens is greatly different from the distance to the date recording layer 4 as described above. The objective lens 8 of the optical pickup 14 is designed so as to focus a laser beam substantially on the data recording layer 4 taking balance between the weights of elements such as the objective lens holding member 36 into consideration. When the optical disk 1 is set in the optical disk device with the surfaces thereof turned upside down to write a visible image on the label layer 6, there will be an offset from the above-described focus position. Therefore, after the optical disk is recognized as described above, the positions of the optical pickup 14 and the objective lens 8 must be automatically adjusted with respect to the optical disk 1, which results in a need for a significant design change on the optical pickup actuator 19. In particular, such a requirement can ruin the design of the optical disk device 11 having a small thickness as described in the present embodiment.

The invention can be applied to an optical disk which is preferably used in a stationary electronic apparatus such as a personal computer, a portable electronic apparatus such as a notebook computer, a personal digital assistant, or a portable display unit, or a recorder for recording images and on which a visible image can be formed.

Embodiment 2

An optical disk device according to Embodiment 2 of the invention will now be described with reference to the drawings.

Figure 10:
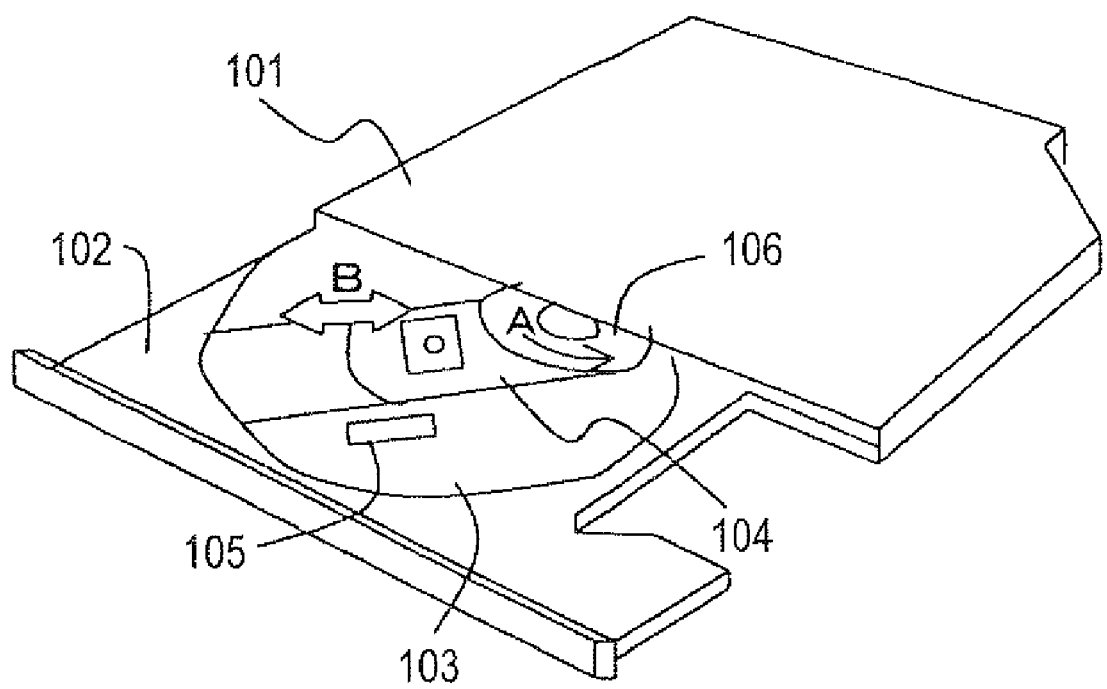
FIG. 10 is a schematic view of an optical disk device in an embodiment of the invention.

FIG. 10 is a schematic view of an optical disk device of the present embodiment. Reference numeral 101 represents the optical disk device; reference numeral 102 represents a tray; and reference numeral 103 represent a PUM (pick up module) loaded an optical pickup 104, a traverse motor 105, and a spindle motor 106.

Figure 11:
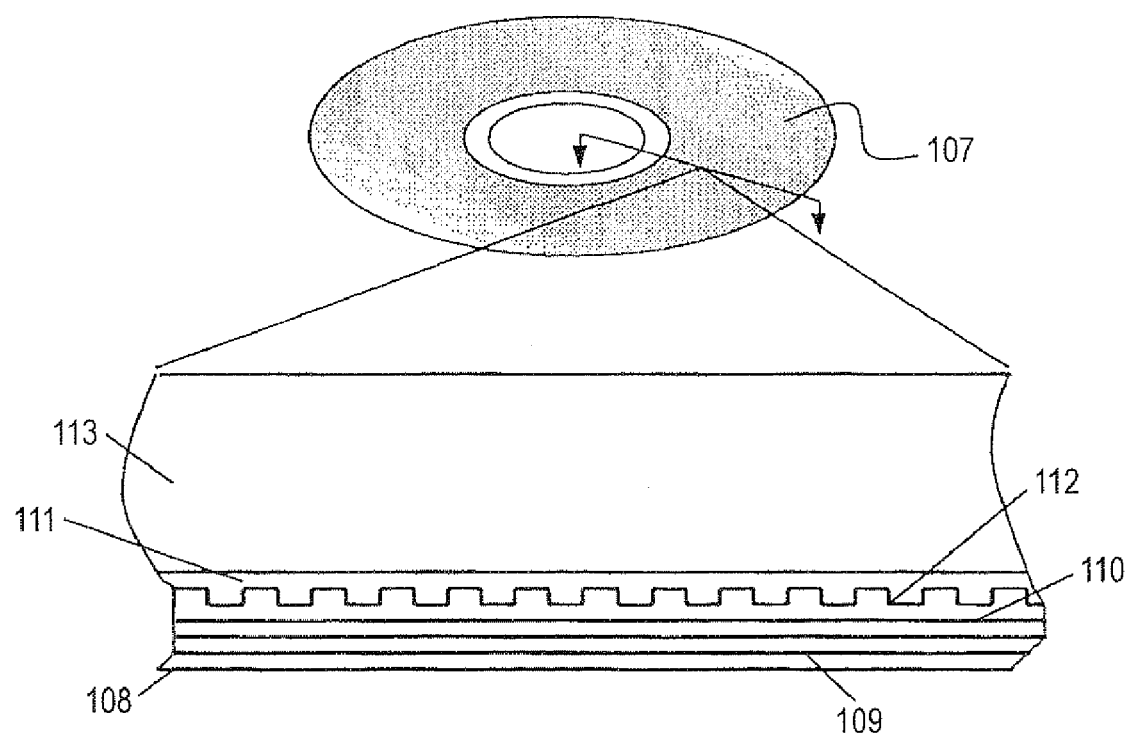
FIG. 11 shows a schematic view of an optical disk in the embodiment of the invention and a partial sectional view of the same.

FIG. 11 illustrates an optical disk 107 and shows a schematic sectional view of the same. The optical disk is constituted by a label surface cover layer 108, a photosensitive/thermosensitive layer 109, a reflecting/radiating surface 110, a data recording layer 112 in the form of a groove (guide groove) 111, and a data surface cover layer 113. The configuration of the layers is merely a typical example, and the thickness of each of the layers may be different from that illustrated. The present embodiment refers to an example of recordable CDs which are the most selling optical disks in the market, and the example has a layer configuration different from that of recordable DVDs.

When normal data recording is performed, the tray 102 is pulled out from the optical disk device 101, and the optical disk 107 is thereafter mounted on the spindle motor 106 such that the data recording surface of the optical disk 107 faces the optical pickup module 103. After the tray 102 is inserted into the optical disk device 101, the optical disk 107 is controlled by the spindle motor 106 for rotation (in the direction of the arrow A), and the optical pickup 104 is controlled by the traverse motor 105 in the radial direction of the optical disk (in the direction of the arrow B). When information is recorded on the optical disk 107, the disk is irradiated with laser light along the groove 111. Therefore, information is recorded by moving the laser light from the optical pickup 104 irradiating the surface of the data cover layer 114 of the optical disk 107 along the groove 111.

When a visible image is to be formed on the photosensitive/thermosensitive layer 109 of the optical disk 107, the optical disk 107 is set on the spindle motor 106 such that the label surface cover layer 108 faces the optical pickup 104 of the optical disk device 101. The optical disk 107 and the optical pickup 104 are controlled by the spindle motor 106 and the traverse motor 105 to irradiate the photosensitive/thermosensitive layer 109 with laser light according to the visible image to be formed, whereby the desired visible image is formed on the photosensitive/thermosensitive layer 109.

Figure 12:
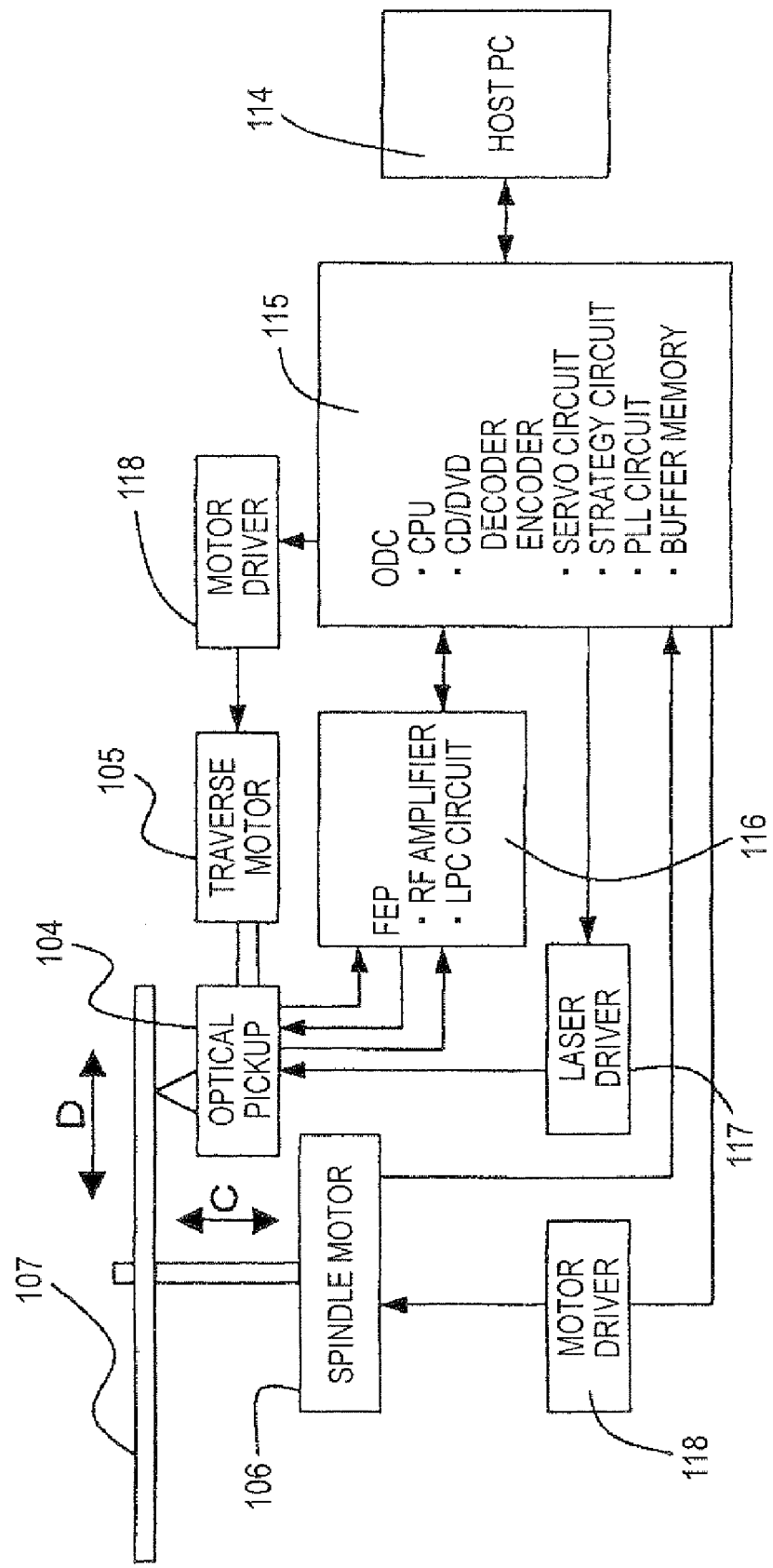
FIG. 12 is a block diagram of the optical disk device in the embodiment of the invention.

FIG. 12 is a block diagram showing a configuration of the optical disk recording device 101 of the present embodiment. As shown in the same figure. The optical disk device 101 is connected to a host PC 114, and it has the optical pickup 104, the traverse motor 105, the spindle motor 106, an ODC (Optical Disk Controller) 115 incorporating a servo circuit, a CD/DVD decoder/encoder, a CPU, a strategy circuit, a PLL (Phase Locked Loop) circuit, and a buffer memory, an FEP (Front End Processor) 16 incorporating an RF (Radio Frequency) amplifier and a laser power control circuit, a laser driver 117, and a motor driver 118 for the traverse and spindle motors.

Figure 13:
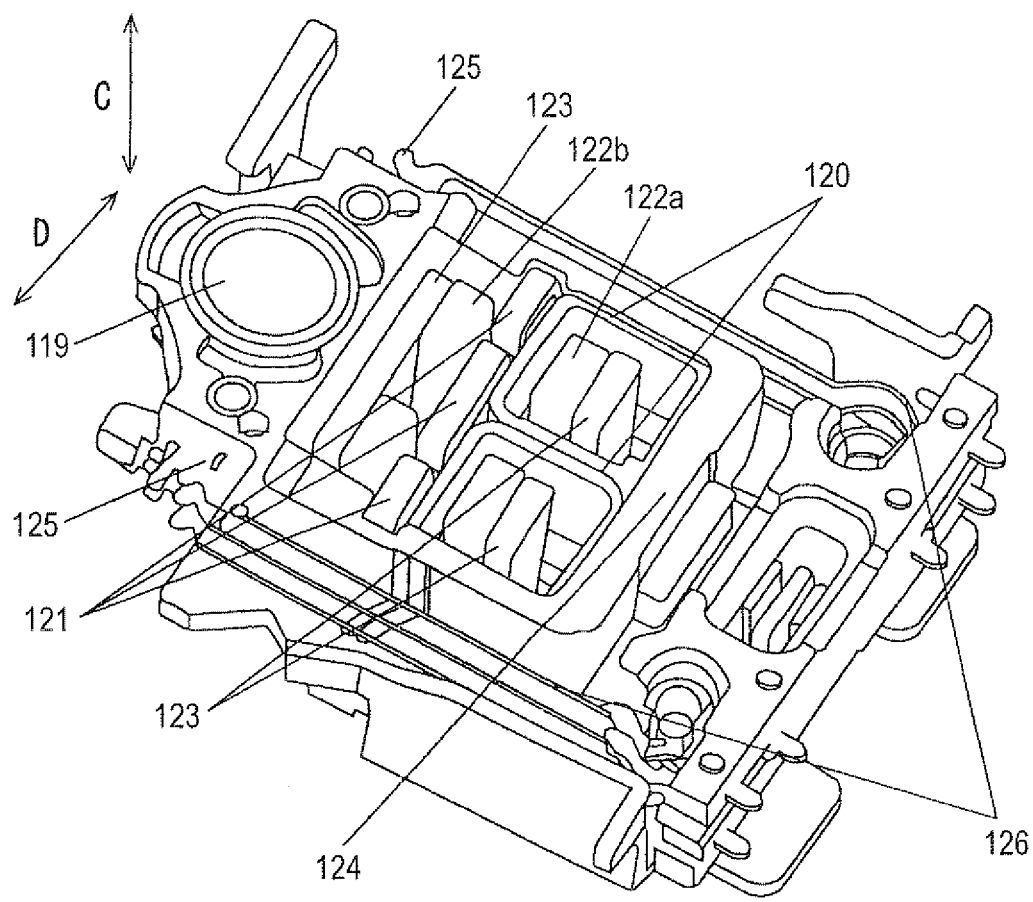
FIG. 13 is a schematic view of an actuator portion of an optical pickup in the embodiment of the invention.

The spindle motor 104 is a motor for holding and rotating the optical disk 107 on which data is to be recorded, and the speed of rotation of the motor is controlled by the servo circuit. The optical pickup 104 is a unit which irradiates the optical disk 107 rotated by the spindle motor 104 with laser light. An objective lens 119 is held by a focus actuator 120 and a tracking actuator 121 at an actuator portion of the optical pickup 104 as shown in FIG. 13, and the lens can be moved relative to the optical disk 107 in a face-to-face relationship therewith in a direction C that is vertical to the surface of the optical disk 107 and in a direction D radial to the optical disk 107. The focus actuator 120 and the tracking actuator 121 move the objective lens 119 relative to the optical disk 107 in the vertical direction C and the radial direction D according to a focus error signal and a tracking error signal, respectively, supplied from the servo circuit (see FIG. 12). The servo circuit generates the focus error signal and the tracking error signal based on a light-reception signal obtained from light, reflected by the optical disk 107 when irradiated by the laser, and the objective lens 119 is moved as described above to perform focus control and tracking control.

The RF amplifier (see FIG. 12) amplifies an RF signal supplied from the optical pickup 104 and outputs the amplified RF signal to the ODC 115 incorporating the servo circuit and the decoder. During reproduction, the CD/DVD decoder performs EFM modulation on the RF signal supplied by the RF amplifier to generate reproduction data. The buffer memory accumulates information to be recorded on a recording surface of the optical disk 107 (hereinafter referred to as data for information recording) supplied from the host PC 114 and information associated with a visual image to be formed on the photosensitive/thermosensitive layer 109 of the optical disk 107 (hereinafter referred to as visible image data). The data for information recording accumulated in the buffer memory is output to the encoder, and the visible image data is output to the controller. The encoder modulates the data to be recorded supplied from the buffer memory and outputs the resultant data to the strategy circuit at which the signal supplied from the encoder is subjected to a time-base correcting process and is then output to the laser driver 117. The laser driver 117 drives a laser diode of the optical pickup 104 according to the signal from the strategy circuit which has been modulated according to the data to be recorded under the control of an LPC circuit. The LPC circuit, which is incorporated in the FEP 116, controls the power of laser light radiated by the laser diode of the optical pickup 110. Specifically, the LPC circuit controls the laser driver 117 such that the optical pickup 104 radiates laser light having a value that agrees with a target value for optimum laser power instructed by the ODC 115. Visible image data supplied from the host PC 114 are sequentially stored in the buffer memory incorporated in the ODC 115. When the host PC 114 creates the visible image data to be formed on the label surface of the optical disk 107 in the bitmap format that is commonly used, the bitmap data is converted into data in the form of polar coordinates, and the converted image data is transmitted from the host PC 114 to the optical disk device 101.

When a visible image is formed on the label surface of the optical disk 107 based on the visible image data supplied as described above, the laser power is at a high level at which recording is performed by changing the color of the photosensitive/thermosensitive layer 109. There is also a low level at which substantially no change occurs on the photosensitive/thermosensitive layer 109 of the optical disk 107 when the photosensitive/thermosensitive layer is irradiated and at which the position of the optical pickup 104 can be controlled by continually monitoring reflected light. Since the position of the optical pickup 104 may be controlled without using reflected light, the low level mode may be deleted.

The traverse motor 105 is a motor for moving the optical pickup 104 in the radial direction D of the optical disk 107.

The driver motor 118 drives the traverse motor 105 by an amount according to a signal supplied by the ODC 115. According to a movement start instruction including the direction and amount of a radial movement of the optical pickup 104, the ODC 115 generates a pulse signal in accordance with the amount and direction of the movement and outputs it to the motor driver 118. The spot irradiated by laser light from the optical pickup 104 can be moved to various positions on the optical disk 107 by moving the optical pickup 104 in the radial direction of the optical disk 107 with the traverse motor 105 and rotating the optical disk 107 with the spindle motor 106, and those elements constitutes the irradiated position adjusting means.

The ODC 115 also comprises a CPU (Central Processing Unit) and a RAM (Random Access Memory), and it is configured to drive each part of the optical disk device 101 according to a program stored in a ROM and to perform centralized control over the process of recording data on the recording surface of the optical disk 107 and the process of forming a visible image on the thermosensitive surface of the optical disk 107.

FIG. 13 shows the actuator portion which moves the objective lens 119 of the optical pickup 104 in the direction C vertical to the optical disk 107 and in the direction D radial to the same. In FIG. 13, the focus actuator 120 is a winding substantially in the form of a ring, and the tracking actuator 121 is also a winding substantially in the form of a ring. The focus actuator 120 and the tracking actuator 121 are secured to an objective lens holding member 124 with an adhesive. A magnetic yoke 123 forms a magnetic circuit in combination with a focus magnet 122a and a tracking magnet 122b. A spring substrate 125 is supplied with power from suspension wires 126 each of which has conductivity, and the substrate is used as a relay substrate for allowing bonding with the objective lens holding member 124. The suspension wires 126 are soldered to the spring substrate 125 at one end thereof, and the focus actuator 120 and the tracking actuator 121 are also secured to the suspension wires 126 by soldering them to the spring substrate 125. Further, the spring substrate 125 is secured to the objective lens holding member 124 with an adhesive. The suspension wires 126 comprise at least six round wires or plate springs such that power can be supplied to the tracking actuator 121 that is series-connected to the focus actuator 120.

The optical disk device 101 according to the present embodiment has a general configuration as described above.

Operations of the optical disk device 101 having the above-described configuration will now be described. As described above, the optical disk device 101 is configured such that it can record information such as audio/video data and PC data supplied from the host PC 114 on a data recording surface of an optical disk 107 and such that it can form a visible image associated with image data supplied from the PC 114 on the photosensitive/thermosensitive surface 109 of the optical disk 107. A description will now be made on operations of the optical disk device 101 which is capable of processes such as information recording and formation of a visible image.

First, when an optical disk 107 is set in the optical disk device 101, the optical pickup 104 is controlled to allow a determination on whether the surface of the optical disk 107 thus set facing the optical pickup 104 is a data recording surface or not. An identification mark that is unique to a visible image recording surface may be provided as a reference for such a determination, and a simpler method may alternatively be employed in which the information recording surface is identified with reference to existing standards for CDs and DVDs. In either case, when the data recording surface is in a face-to-face relationship with the optical pickup 104, the spindle motor 106, the traverse motor 105, the optical disk 107, and the optical pickup 104 are driven and controlled similarly to recordable optical disk devices in the related art. When the disk is set with a label surface thereof faced with the optical pickup 104, the distance between the objective lens 119 (FIG. 14) mounted on the optical pickup 104 and the photosensitive/thermosensitive layer of the optical disk 107 facing the lens is greatly different from the distance between the same elements in the case that the data recording surface faces the optical pickup. The objective lens 119 of the optical pickup 104 is designed so as to focus a laser beam substantially on the data recording layer 112 taking balance between the weights of elements such as the objective lens holding member 124 into consideration. When the optical disk 107 is set in the optical disk device 101 with the surfaces thereof turned upside down to write a visible image on the label surface, there will be an offset from the above-described focus position. Therefore, after the optical disk is recognized as described above, the positions of the optical pickup 104 and the objective lens 119 must be automatically adjusted with respect to the optical disk 107 according to the method described below.

Figure 14:
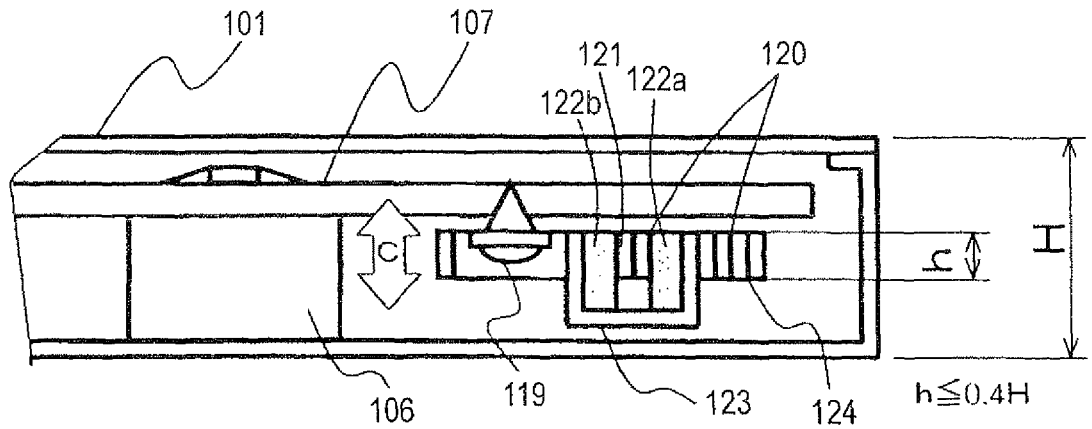
FIG. 14 is a sectional view of the optical disk device in the embodiment of the invention.
Figure 14:
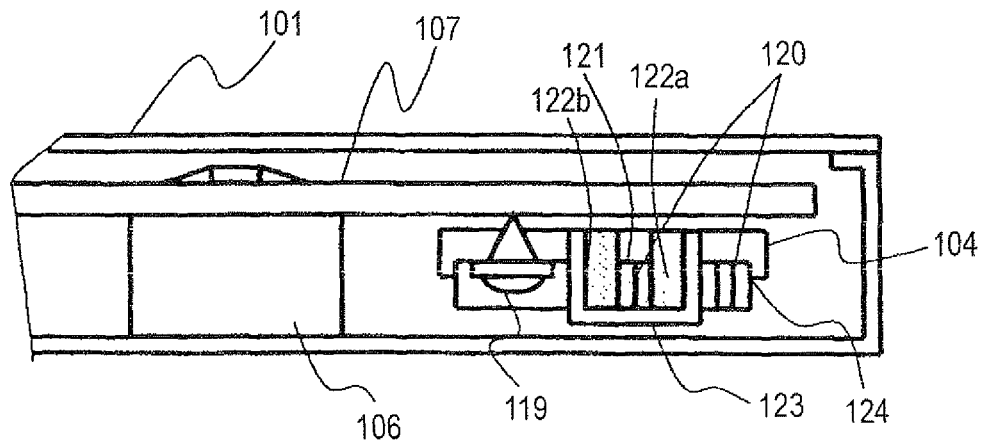

A description will now be made with reference to FIG. 14 on an example in which a CD-R is used in the optical disk device 101 of the present embodiment. When the optical disk 107 is set for recording on the data surface, as shown in FIG. 11, the data recording later 112 is in the vicinity of the surface opposite to the surface on which laser light impinges. When a visible image is to be formed on the label surface, since the optical disk 107 is set with the surfaces thereof turned upside down from the position for recording on the data surface, the focusing position of laser light moves to the neighborhood of the surface facing the optical pickup 104. That is, the focusing positions of laser light are offset from each other by an amount equivalent to the thickness of the optical disk 107. Specifically, when the optical disk 107 is a CD-R, an offset of about 1.2 mm must be dealt with. The actuator portion (FIG. 13) of an ordinary optical pickup 104 has a movable range (performance) of ±1 mm to accommodate staggers of the surface of the optical disk 107 during rotation. However, an offset of about ±1.2 mm as in the present embodiment is in the excess of the movable range. In order to solve this problem, it is required to make a drastic modification of the design of the optical pickup 104 that is the key device. In the present embodiment, in order to solve the above-described problem with a minimum cost increase, a study is made on the use of an optical pickup 104 which can be incorporated in optical disk devices in different standard configurations. Specifically, an optical pickup 104 for an optical disk device having a thickness of 9.5 mm to be incorporated in a notebook PC is loaded in an optical disk device 101 having a thickness of 12.7 mm which is also to be incorporated in a notebook PC. The optical pickup 104 for the 9.5 mm thick optical disk device is made thinner than an optical pickup for the 12.7 mm thick optical disk device 101 taking the thickness of the optical disk device 101 into consideration. The difference in thickness is greater than the offset required for the objective lens 119 when the optical disk 107 is turned upside down as described above. In the present embodiment, as shown in FIG. 14, a magnetic circuit formed by a focusing magnet 122a, a tracking magnet 122b, and a magnetic yoke 123 of the optical pickup 104 for the 9.5 mm thick optical disk device is extended below the optical disk device 101. A configuration is thus provided, in which a downward offset of the objective lens 119 can be accommodated when a visible image is recorded. As a result, when the label surface of the optical disk 107 is set on the optical disk device 101, the objective lens 119 mounted on the optical pickup 104 is automatically adjusted to a proper position with respect to the label surface, and a visible image is formed by controlling the rotation of the optical disk 107 and the driving of the optical pickup 104 controlled according to image data sent from the host PC.

Figure 15:
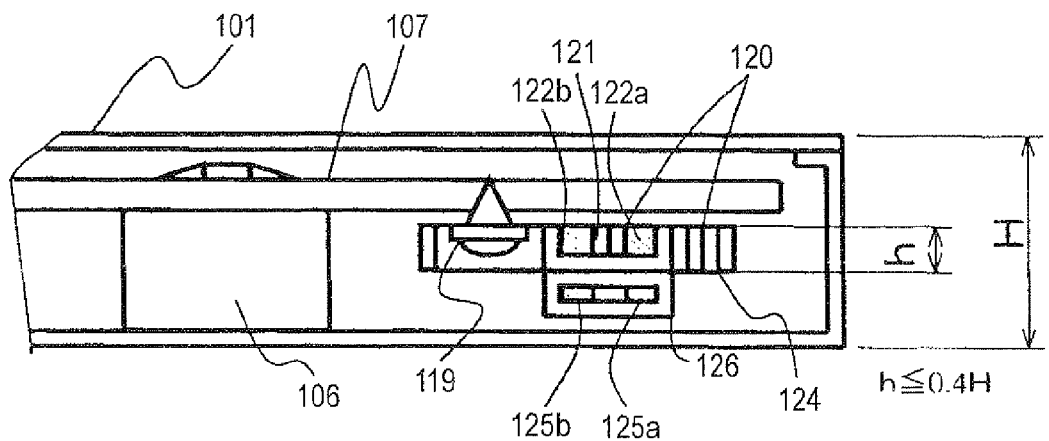
FIG. 15 is a sectional view of an optical disk device in the embodiment of the invention.

As an alternative mode of the present embodiment, the extension of the magnetic circuit may be implemented as an add-on type as shown in FIG. 15 instead of the integral type as described above. Specifically, a focusing magnet 125a and a tracking magnet 125b may be separately provided under the focusing magnet 122a and the tracking magnet 122b, respectively, and an add-on type magnetic yoke 126 may be provided under the magnetic yoke 123. The focusing magnet 122a, tracking magnet 122b, and the magnetic yoke 123 are connected to the focus magnet 122b, tracking magnet 125b, and magnetic yoke 126 respectively such that they are electromagnetically continuous. An offset of the objective lens 119 can be accommodated by adding only required one(s) of those elements to the optical pickup according to the related art.

Although the present embodiment has been described as an example in which the optical disk 107 is a CD-R, a CD-RW can be similarly accommodated. The embodiment also provides effective means for accommodating various media in compliance with DVD standards and next generation DVDs adapted to blue lasers. The present embodiment has been described as an example in which an optical pickup for a 9.5 mm thick optical disk device is loaded in a drive having a thickness of 12.7 mm. The above disclosure also advantageously applies to each of standard sizes of optical disk devices, i.e., thickness of 41.5 mm, 12.7 mm, and 9.5 mm and, in addition, the above-described means can be practically applied to even a drive out of standard specifications as long as an optical pickup having a thickness h satisfying an expression $h \leq 0.4H$ (H represents the thickness of the optical disk device) is used. A lower limit for the thickness of an optical pickup is expressed by $0.1H \leq h$, and the above-described means can be used for optical pickup that satisfy a relationship expressed by $0.1 \leq h \leq 4H$.

Embodiment 3

An optical disk device according to Embodiment 3 of the invention will now be described with reference to the drawings.

Figure 16:
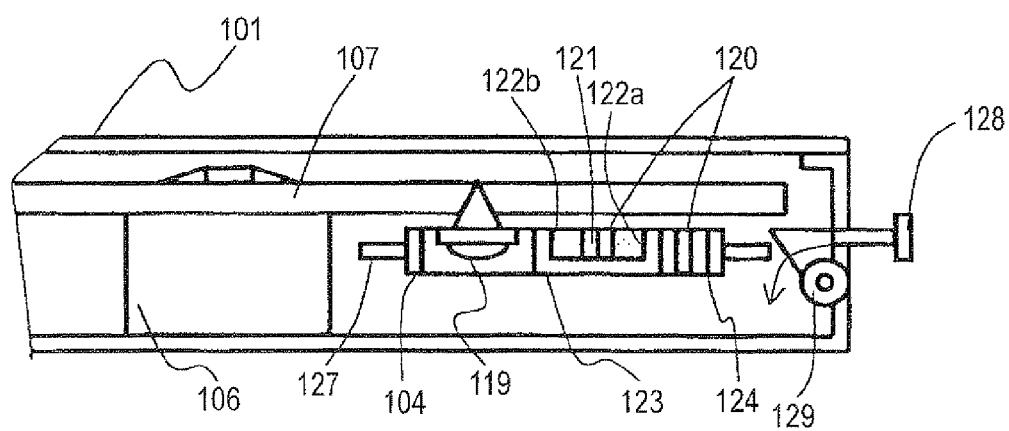
FIG. 16 is a sectional view of an optical disk device in another embodiment of the invention.

FIG. 16 is a schematic view of an optical disk device according to another embodiment of the invention. Reference numeral 101 represents the optical disk device, and reference numeral 104 represents an optical pickup. The optical pickup 104 has a thickness h which satisfies a relationship expressed by $h \leq 4H$ (or $0.1 \leq h \leq 4H$ when a lower limit is to be considered) where H represents the thickness of the optical disk device 101. Reference numeral 106 represents a spindle motor. Reference numeral 107 represents an optical disk. Reference numeral 119 represents an objective lens. Reference numeral 120 represents a focus actuator. Reference numeral 121 represents a tracking actuator. Reference numeral 122a represents a focusing magnet. Reference numeral 122b represents a tracking magnet. Reference numeral 123 represents a magnetic yoke. Reference numeral 127 represents a guide shaft for driving the optical pickup 104 in the radial direction of the disk 107. Reference numeral 128 represents a button which can be operated outside the housing of the optical disk device 101. Reference numeral 129 represents a rotation transmission member which rotates in conjunction with the button 128 to move the guide shaft 127 up and down.

In the present embodiment, the distance between the optical disk 107 and the objective lens 119 is manually adjusted as means for coping with an offset that occurs between the optical disk 107 and the objective lens 119 when a visible image is formed on a label surface of the optical disk 107. Specifically, a user directly operates the button 128 after setting the optical disk 107 with the surface thereof opposite to a data recording surface faced with the optical pickup 104 to record a visible image on the label surface of the disk. When the user depresses the button 128, the rotation transmission member 129 rotates to move the guide shaft 127 which regulates the position of the optical pickup 104 such that the guide shaft 127 is pushed down while being kept in parallel with the optical disk 107. At this time, the button 128 may have a function of pushing down the shaft stepwise to several positions associated with existing standards for optical disks (CDs and DVDs) and a function of displaying the current position (state) of data recording, a label surface of a CD, or a label surface of a DVD (the function is not shown). The above-described manual adjustment means may be provided in a space created by the use of an optical pickup a size smaller, which allows a label to be printed by an optical disk device at a very low cost.

Embodiment 4

An optical disk device according to Embodiment 1 of the invention will now be described with reference to the drawings.

Figure 17:
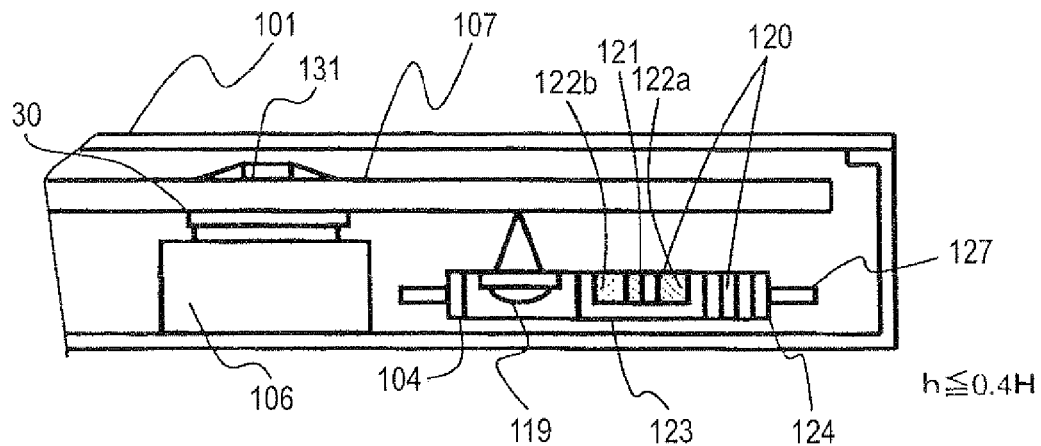
FIG. 17 is a sectional view of an optical disk device in another embodiment of the invention.

FIG. 17 is a schematic view of an optical disk device according to another embodiment of the invention. Reference numeral 101 represents the optical disk device, and reference numeral 104 represents an optical pickup. The optical pickup 104 has a thickness h which satisfies a relationship expressed by $h \leq 4H$ (or $0.1 \leq h \leq 4H$ when a lower limit is to be considered) where H represents the thickness of the optical disk device 101. Reference numeral 106 represents a spindle motor. Reference numeral 107 represents an optical disk. Reference numeral 19 represents an objective lens. Reference numeral 120 represents a focus actuator. Reference numeral 121 represents a tracking actuator. Reference numeral 122a represents a focusing magnet. Reference numeral 122b represents a tracking magnet. Reference numeral 123 represents a magnetic yoke. Reference numeral 127 represents a guide shaft. Reference numeral 130 represents a turntable which is a part of the spindle motor 106 and on which the optical disk 107 is placed. Reference numeral 131 represents a chucking portion which is a part of the spindle motor 106 and which holds the optical disk 107. The optical pickup 104 and the guide shaft 127 are disposed lower than positions in which they would be located according to the related art. Since the position of the optical disk 107 is determined accordingly, the device has a space above the optical disk 107 unlike an optical disk device 101 according to the related art. The space thus created is set greater than at least the thickness of the optical disk 107.

In the present embodiment, the turntable 130 and the chucking portion 131 of the spindle motor 6 holding the optical disk 107 are automatically moved up and down when recording is performed on a label surface to serve as means for coping with any offset generated between the optical disk 107 and the objective lens 119 when a visible image is formed on the label surface of the optical disk 107. First, when the optical disk 107 is set in the optical disk device 101, the optical pickup 104 is controlled to allow a determination on whether the surface of the optical disk 107 thus set facing the optical pickup 104 is a data recording surface or not. An identification mark that is unique to a visible image recording surface may be provided as a reference for such a determination, and a simpler method may alternatively be employed in which the information recording surface is simply identified with reference to existing standards for CDs and DVDs.

When the surface facing the optical pickup 104 is recognized as the label surface according to the method as described above, an actuator (not shown) incorporated in the spindle motor 106 moves the turntable 130 and the chucking portion 131 upward with the optical disk 107 held thereby. The optical disk 107, which is moved upward by being held by the turntable 130 and the chucking portion 131, is adjusted such that the label surface thereof is kept at a proper distance from the objective lens 119. The maximum amount of the upward movement is equivalent to the thickness of the optical disk 107, although the amount depends on the type of the optical disk 107 thus set.

Figure 18:
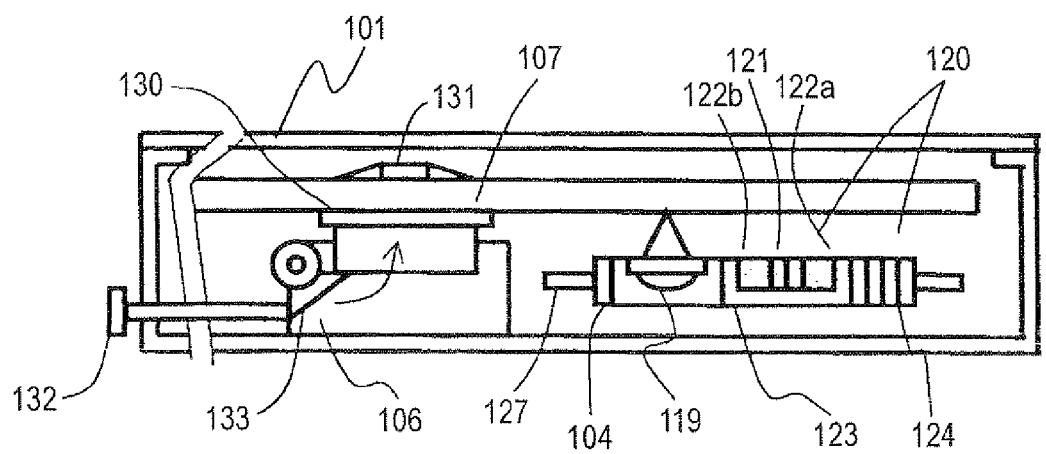
FIG. 18 is a sectional view of an optical disk device in the embodiment of the invention.

FIG. 18 shows a modification of the embodiment shown in FIG. 17. Reference numeral 132 represents a button which can be operated outside the housing of the optical disk device 101, and reference numeral 133 represents a rotation transmission member which rotates in conjunction with the button 132 to move the turntable 130 of the spindle motor 106 up and down. In the present embodiment, the distance between the optical disk 107 and the objective lens 119 is manually adjusted as means for coping with an offset that occurs between the optical disk 107 and the objective lens 119 when a visible image is formed on the label surface of the optical disk 107. Specifically, a user directly operates the button 132 after setting the optical disk 107 with the surface thereof opposite to a data recording surface faced with the optical pickup 104 to record a visible image on the label surface of the disk. When the user depresses the button 132, the rotation transmission member 133 rotates to move the optical disk 107 such that the turntable 130 and the chucking portion 131 holding the optical disk 107 are pushed upward while being kept in parallel with the optical pickup 104. At this time, the button 132 may have a function of pushing those elements stepwise to several positions associated with existing standards for optical disks (CDs and DVDs) and a function of displaying the current position (state) of data recording, a label surface of a CD, or a label surface of a DVD (the function is not shown).

In all of the embodiments described above, in case that the optical pickup 104 is not in the predetermined position with respect to the photosensitive/thermosensitive layer 109 of the optical disk 107 when the surface of the optical disk 107 facing the optical pickup 104 is the label surface, the operator may be notified of the abnormality by issuing an alarm tone, turning on or blinking an LED, or sending an error message to the host PC.

Embodiment 5

An optical disk device according to Embodiment 5 of the invention will now be described with reference to the drawings.

Figure 19:
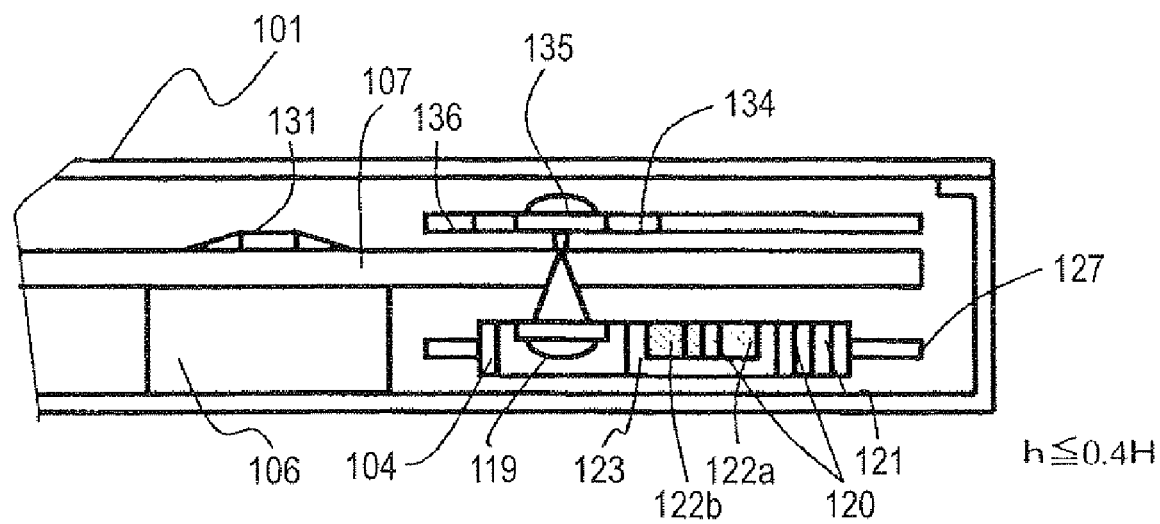
FIG. 19 is a sectional view of an optical disk device in another embodiment of the invention.

FIG. 19 is a schematic view of an optical disk device according to another embodiment of the invention. Reference numeral 101 represents the optical disk device, and reference numeral 104 represents an optical pickup. The optical pickup 104 has a thickness h which satisfies a relationship expressed by $h \leq 4H$ (or $0.1 \leq h \leq 4H$ when a lower limit is to be considered) where H represents the thickness of the optical disk device 101. Reference numeral 106 represents a spindle motor. Reference numeral 107 represents an optical disk. Reference numeral 19 represents an objective lens. Reference numeral 120 represents a focus actuator. Reference numeral 121 represents a tracking actuator. Reference numeral 122a represents a focusing magnet. Reference numeral 122b represents a tracking magnet. Reference numeral 123 represents a magnetic yoke. Reference numeral 127 represents a guide shaft. Reference numeral 131 represents a chucking portion. The optical pickup 4 and the guide shaft 127 are disposed lower than positions in which they would be located according to the related art. Since the position of the optical disk 107 is determined accordingly, the device has a space above the optical disk 107 unlike an optical disk device 101 according to the related art. The space thus created is set greater than at least the thickness of the optical disk 107. Reference numeral 134 represents an optical pickup for recording on a label provided in the space created as described above. Reference numeral 135 represents an objective lens for recording on a label mounted on the optical pickup 134 for recording on a label. Reference numeral 136 represents a guide shaft for recording on a label which guides the optical pickup 134 for recording on a label in the radial direction. The optical pickup 4 and the optical pickup 134 for recording on a label are adjusted such that laser light radiated through the objective lens 119 and laser light radiated through the objective lens 135 for recording on a label will impinge on the optical disk 107 in substantially the same position although they will impinge on different surfaces of the disk. That is, the optical pickup 104 and the optical pickup 134 for recording on a label are driven to substantially the same position by using a common servo signal and a common source for traverse driving when they are moved in the radial direction. Alternatively, the optical pickup 104 and the optical pickup 134 for recording on a label may be structurally integrated (not shown) to satisfy the above-described requirement.

A lens having a relatively small numerical aperture is chosen as the objective lens for recording on a label mounted on the optical pickup 134 for recording on a label. A lens having a numerical aperture of 0.4 or less is mounted. Although the optical pickup 134 for recording on a label is provided in addition to the optical pickup 104 that is used for recording data as in the related art, it may be configured so as to move in conjunction with the optical pickup 104. Therefore, it is not necessary to provide an adjustment optical system (not shown) and an element for receiving reflected light (not shown) which are mounted in an optical pickup 104 according to the related art. Specifically, the pickup 134 can perform tracking in the radial direction by following up the optical pickup 104. Referring to focusing, since the objective lens 134 for recording an a label has a small numerical aperture, the optical disk 107 can be irradiated with laser light which is insensitive to upward and downward movements of the position of the optical disk. That is, by allowing the optical pickup 134 for recording on a label to operate in conjunction with the optical pickup 104 according to the related art, the pickup 134 can be provided as very simple and inexpensive part which is dedicated for recording.

The optical pickup 134 for recording on a label is required to have a configuration with a very small thickness. For example, the requirement may be satisfied by using an optical fiber (not shown) as the optical system of the optical pickup 134 for recording on a label. A laser diode (not shown) for recording on a label may be disposed in a position which is inside the optical disk device 101 and which is out of the projected area of the optical disk 107, and laser light may be made to impinge on the objective lens 135 for recording on a label using the optical fiber. Thus, it is possible to provide a very thin optical pickup 134 for recording on a label which can be disposed in a small space above the optical disk 107 and to provide a configuration which is advantageous in view of the problem of heat radiation from a laser that is likely to occur in a thin optical pickup 104 having a small thermal capacity.

Patterns for irradiation with laser light may be maintained in the form of a table to accommodate recording in conditions at low temperatures. Currently, there are only limited applications of photosensitive and thermosensitive materials which are used for recording by being colored through a reaction with laser light, and it is therefore substantially impossible to find such a material or optical disk 107 on which the same recording quality can be maintained under any condition. Under the circumstance, patterns for repeated laser irradiation may be provided to offset various undesirable conditions, in particular, low temperatures.

Further, recording of data on a data surface and recording of a visible image on a label surface may be simultaneously performed utilizing the above-described multi-pickup configuration constituted by the optical pickup 104 and the optical pickup 134 for recording on a label. In the future, improvements of the performance of LSIs used in a system configuration of a recordable optical disk device may allow a visible information writing process to be performed in parallel with a normal data writing process to dramatically shorten time required for writing on a label surface.

Embodiment 6

An optical disk device according to Embodiment 6 of the invention will now be described with reference to the drawings.

An optical disk device according to the invention can be used as an optical disk device capable of recording a visible image on a label surface of an optical disk where the label printing function must be provided at a low cost.

Figure 20:
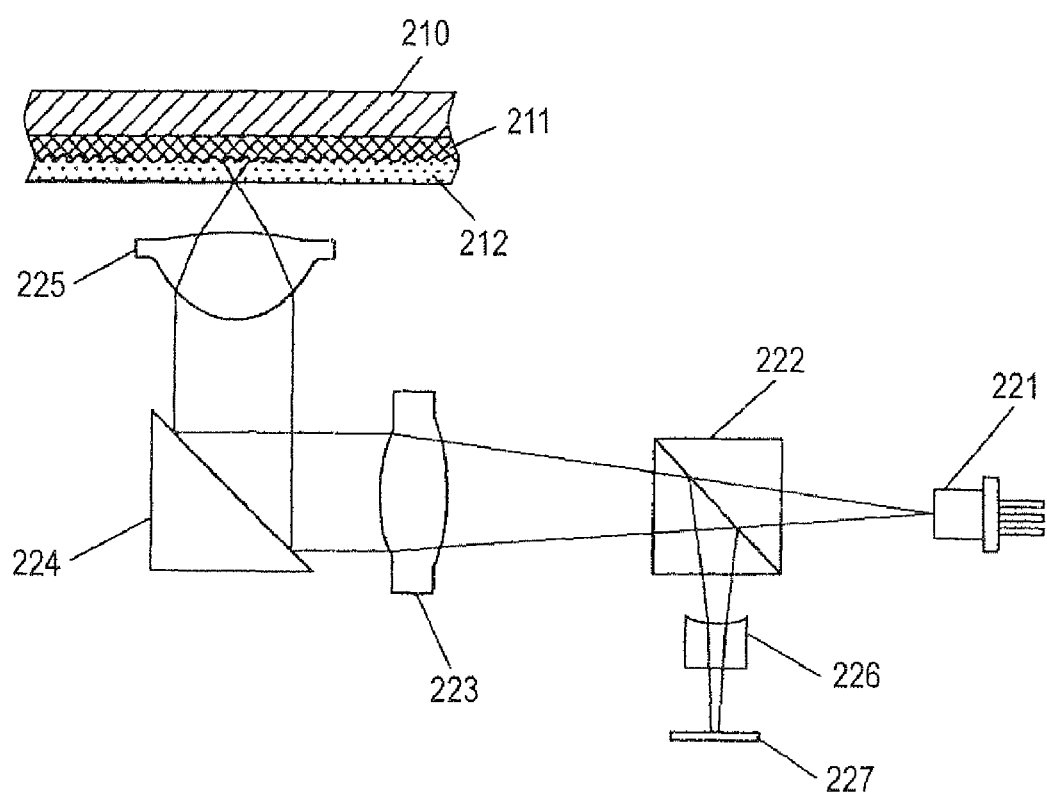
FIG. 20 shows a configuration of an optical disk device according to an embodiment of the invention.

FIG. 20 shows a configuration of an optical disk device according to an embodiment of the invention. In FIG. 20, an optical disk 210 has a label to be printed, the label comprising a printing layer 211, which includes a leuco type thermosensitive material, provided on a surface thereof and a protective layer 212 made of a transparent resin having a thickness of 30 µm and a refractive index n=1.5.

Light emitted by a laser light source 221 passes through a beam splitter 222 and a collimator lens 223. The light is then reflected by a reflecting mirror 224 and converged by an objective lens 225 on a surface of the protective layer 212. The numerical aperture of the objective lens 225 is 0.6, and the objective lens 225 is held by a focus servo mechanism, which is not shown, for changing the position of the lens relative to the optical disk. The light which has exited the objective lens 225 passes through air whose refractivity $n_0$=1.0 to impinge on the protective layer 212. The light is then subjected to Fresnel reflection attributable to a difference in refractivity on the surface of the protective layer 212, and about 4% of the incident light is mirror-reflected. The mirror-reflected light is returned through the same objective lens 225 and collimator lens 223, split by the beam splitter 222, guided to a cylindrical lens 226 for effecting focus servo, and received by an optical sensor 227.

As a result of an action of the cylindrical lens 226, a distribution of luminous energy is generated on the optical sensor 227 according to the positional relationship between the position of the focus of the light and the surface of the protective layer 212, and the objective lens 225 of the optical pickup is focused on the surface of the protective layer 212 based on a signal generated according to the distribution of luminous energy. About 96% of the light which has passed through the protective layer 212 becomes a light spot having a diameter of about 26 μm on the printing layer 211 depending on the thickness and refractivity of the protective layer 212 and the numerical aperture of the objective lens 225. A part of the light is absorbed by the printing layer 211 and converted into heat which changes the color of the layer, whereby the printing layer 211 is printed.

The diameter of the light spot projected on the printing layer 211 or the energy density of the optical beam varies depending on the thickness of the transparent protective layer 212 on the printing layer 211, the refractivity of the protective layer 212, and the numerical aperture of the objective lens 225 of the optical pickup. The thickness and refractivity of the protective layer 212 can be appropriately set in accordance with the numerical aperture of the objective lens 225 and printing sensitivity characteristics of the printing layer 211.

Each of embodiments can be combined to each other at the same time.

This application is based on and claims the benefit of priority of Japanese Patent Application No2004-216781 filed on Jul. 26, 2004, and Japanese Patent Application No2004-221351 filed on Jul. 29, 2004, Japanese Patent application No2004-239272 filed on Aug. 19, 2004, the contents of which are incorporated herein by references in its entirety. And also this application is based on Japanese patent Application No2004-127836 filed on Apr. 23, 2004.

What is claimed is:

1. An optical disk device in which an optical disk, having a first recording portion for recording information and a second recording portion allowing display of a visible image, is mounted and which is configured to perform at least either recording or reproduction of information at the first recording portion and to display a visible image at the second recording portion, the optical disk device comprising:
   a first light source;
   a second light source emitting light having a wavelength longer than that of the first light source;
   light-receiving portion; and
   an optical member, for guiding light emitted by the first light source and the second light source to the optical disk and for guiding at least a part of light reflected by the optical disk to the light-receiving portion,
   wherein a visible image is formed at the second recording portion with the first light source, and
   wherein at least either recording or reproduction of information is performed at the first recording portion of the optical disk with the first light source and wherein only either recording or reproduction of information is performed at the first recording portion with the second light source.

2. The optical disk device according to claim 1, wherein the first light source emits light having a short wavelength equal to or smaller than that of blue light.

3. The optical disk device according to claim 1, wherein the second light source comprises a plurality of light sources emitting beams of light having wavelengths different from each other.

4. The optical disk device according to claim 3, wherein the second light source emits at least substantially red light and substantially infrared light.

5. The optical disk device according to claim 4, wherein the second light source comprises a mono-block and wherein light having two different wavelengths is emitted by the mono-block.

6. The optical disk device according to claim 1, further comprising:
   a rotation driving portion that rotates the optical disk;
   a carriage on which at least the first light source, the second light source, and an optical member are mounted and movably held; and
   a movement driving portion which is a source of driving of the carriage.

7. The optical disk device according to claim 1, wherein the optical member includes an objective lens and wherein the objective lens is held such that it can move within a predetermined range to converge light traveling toward the optical disk with the objective lens.

8. An optical disk device in which an optical disk, having a first recording portion for recording information and a second recording portion allowing display of a visible image, is mounted and which is configured to perform at least either recording or reproduction of information at the first recording portion and to display a visible image at the second recording portion, the optical disk device comprising:
   a first light source;
   a second light source emitting light having a wavelength longer than that of the first light source;
   a light-receiving portion; and
   an optical member that guides light emitted by the first light source and the second light source to the optical disk and that guides at least a part of light reflected by the optical disk to the light-receiving portion,
   wherein a visible image is formed at the second recording portion with the first light source,
   wherein at least one of recording and reproduction of information is performed at the first recording portion of the optical disk with the first light source, and
   wherein at least one of recording and reproduction of information is performed at the first recording portion of the optical disk with the second light source.

* * * * *